US011283650B2

(12) United States Patent
Ma

(10) Patent No.: US 11,283,650 B2
(45) Date of Patent: *Mar. 22, 2022

(54) METHOD FOR SENDING VIRTUAL EXTENSIBLE LOCAL AREA NETWORK PACKET, COMPUTER DEVICE, AND COMPUTER READABLE MEDIUM

(71) Applicant: Huawei Technologies Co., Ltd., Shenzhen (CN)

(72) Inventor: Zhenliang Ma, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/703,392

(22) Filed: Dec. 4, 2019

(65) Prior Publication Data
US 2020/0112457 A1 Apr. 9, 2020

Related U.S. Application Data

(63) Continuation of application No. 16/019,003, filed on Jun. 26, 2018, now Pat. No. 10,771,286, which is a (Continued)

(51) Int. Cl.
*H04L 12/46* (2006.01)
*G06F 9/455* (2018.01)
(Continued)

(52) U.S. Cl.
CPC ...... *H04L 12/4641* (2013.01); *G06F 9/45558* (2013.01); *H04L 12/46* (2013.01);
(Continued)

(58) Field of Classification Search
None
See application file for complete search history.

(56) References Cited

U.S. PATENT DOCUMENTS 8,923,155 B2 12/2014 Qu et al.
10,771,286 B2 * 9/2020 Ma ............... H04L 12/4641
(Continued)

FOREIGN PATENT DOCUMENTS

CN 103814554 A 5/2014
CN 103873374 A 6/2014
(Continued)

OTHER PUBLICATIONS

U.S. Appl. No. 16/019,003, filed Jun. 26, 2018, Pending.
(Continued)

*Primary Examiner* — Kouroush Mohebbi
(74) *Attorney, Agent, or Firm* — Leydig, Voit & Mayer, Ltd.

(57) ABSTRACT

A method for sending a VxLAN packet, a computer device, and a computer readable medium, to resolve a problem that a network adapter cannot forward a VxLAN packet in the prior art. By means of the method for forwarding a VxLAN packet provided in the embodiments of the present disclosure, after receiving a first packet, a network adapter determines whether the network adapter stores encapsulation information required for performing VxLAN encapsulation on the first packet; if the network adapter stores the encapsulation information, performs VxLAN encapsulation on the first packet and sends the first packet; or if the network adapter does not store the encapsulation information, requests the encapsulation information from a central processing unit and stores the encapsulation information; and sends a packet obtained after the VxLAN encapsulation is performed on the first packet.

17 Claims, 6 Drawing Sheets

Related U.S. Application Data continuation of application No. PCT/CN2015/100150, filed on Dec. 31, 2015.

(51) Int. Cl.
*H04L 61/103* (2022.01)
*H04L 61/2592* (2022.01)
*H04L 101/622* (2022.01)

(52) U.S. Cl.
CPC ........ *H04L 12/4633* (2013.01); *H04L 61/103* (2013.01); *H04L 61/2592* (2013.01); *H04L 61/6022* (2013.01); *G06F 2009/45595* (2013.01); *H04L 2212/00* (2013.01)

(56) References Cited

U.S. PATENT DOCUMENTS

| | | | |
|---|---|---|---|
| 2011/0310801 | A1 | 12/2011 | Kong et al. |
| 2014/0059111 | A1 | 2/2014 | Veeraiyan et al. |
| 2014/0086253 | A1 | 3/2014 | Yong |
| 2014/0146817 | A1 | 5/2014 | Zhang |
| 2014/0269321 | A1 | 9/2014 | Kamble et al. |
| 2015/0180959 | A1* | 6/2015 | Bloch ................. H04L 12/4633 709/217 |
| 2015/0350081 | A1* | 12/2015 | DeCusatis ............... H04L 47/12 370/235 |
| 2015/0358232 | A1 | 12/2015 | Chen et al. |
| 2015/0381494 | A1* | 12/2015 | Cherian ................ H04L 45/745 370/392 |
| 2016/0197824 | A1 | 7/2016 | Lin et al. |
| 2016/0261496 | A1 | 9/2016 | Chang |

FOREIGN PATENT DOCUMENTS

| | | | |
|---|---|---|---|
| CN | 103905283 | A | 7/2014 |
| CN | 103905309 | A | 7/2014 |
| CN | 104468358 | A | 3/2015 |
| CN | 104506408 | A | 4/2015 |
| CN | 104601427 | A | 5/2015 |
| CN | 105162647 | A | 12/2015 |
| CN | 105162674 | A | 12/2015 |
| CN | 105207873 | A | 12/2015 |
| WO | 2015062529 | A1 | 5/2015 |

OTHER PUBLICATIONS

Mahalingam et al.,"Virtual eXtensible Local Area Network (VXLAN): A Framework for Overlaying Virtualized Layer 2 Networks over Layer 3 Networks," pp. 1-22, Request for Comments: 7348 (Aug. 2014).

"ConnectX®-4 Ethernet Single and Dual Port QSFP28 Adapter Card User Manual," Rev 1.8, www.mellanox.com, pp. 1-80, P/N:MCX413A-BCAT (2016).

"ConnectX®-4 Lx EN," Ethernet Adapter Cards—Product Brief,10/25/40/50 Gigabit Ethernet Adapter Card, pp. 1-3, © 2015 Mellanox Technologies (2015).

"Virtual Bridged Local Area Networks," IEEE Computer Society, pp. 1-303, IEEE Std 802.1Q™-2005, IEEE Standard for Local and metropolitan area networks, Institute of Electrical and Electronics Engineers—New York, New York (2005).

Mahalingam et al., "VXLAN: A Framework for Overlaying Virtualized Layer 2 Networks over Layer 3 Networks draft-mahalingam-dutt-dcops-vxlan-00.txt," pp. 1-22, Network Working Group (Aug. 26, 2011).

Yong et al.,"NVGRE and VXLAN Encapsulation for L3VPN Extension draft-yong-l3vpn-nvgre-vxlan-encap-01," pp. 1-8. Network working group (May 21, 2013).

Mahalingam et al., "VXLAN: A Framework for Overlaying Virtualized Layer 2 Networks over Layer 3 Networks draft-mahalingam-dutt-dcops-vxlan-09 .txt," pp. 1-24, Internet Engineering Task Force (Apr. 10, 2014).

CN/202010969660.6, Office Action/Search Report, dated May 20, 2021.

U.S. Appl. No. 16/019,003, filed Jun. 26, 2018, Patented.

\* cited by examiner

METHOD FOR SENDING VIRTUAL EXTENSIBLE LOCAL AREA NETWORK PACKET, COMPUTER DEVICE, AND COMPUTER READABLE MEDIUM

CROSS-REFERENCE TO RELATED APPLICATIONS

This application is a continuation of U.S. patent application Ser. No. 16/019,003, filed on Jun. 26, 2018, which is a continuation of International Application No. PCT/CN2015/100150, filed on Dec. 31, 2015. All of the aforementioned applications are hereby incorporated by reference in their entireties.

TECHNICAL FIELD

Embodiments of the present disclosure relate to the field of information technologies, and in particular, to a method for sending a virtual extensible local area network VxLAN packet, a computer device, and a computer readable medium.

BACKGROUND

A virtual extensible local area network (VxLAN) uses a Media Access Control (MAC) Over user datagram protocol (UDP) technology, which is an overlay network technology or a tunnel technology. The VxLAN encapsulates a data packet sent by a virtual machine into the UDP and uses the Internet Protocol (IP)/MAC of a physical network as an outer-header to perform encapsulation. The data packet then is transmitted over a physical IP network and is decapsulated by a tunnel termination point after reaching a destination, and data is sent to a target virtual machine. A packet sent using the VxLAN technology is a VxLAN packet, and the VxLAN packet usually includes a VxLAN tunnel header and an original payload. The VxLAN tunnel header includes an outer destination MAC address, an outer source MAC address, an outer destination IP address, an outer source IP address, an outer UDP header, and a VxLAN network identifier (VNI). The original payload includes an inner destination MAC address, an inner source MAC address, inner 802.1Q, and an original Ethernet valid payload. Implementation of sending of a VxLAN packet requires information about the VxLAN tunnel header and the original payload.

On a computer device running a virtual machine service, a network adapter can identify and forward a virtual local area network (VLAN) packet sent by the virtual machine. However, for the VxLAN packet, the network adapter does not have a capability of obtaining information required for forwarding the VxLAN packet, and therefore the network adapter cannot encapsulate and send the VxLAN packet.

SUMMARY

Embodiments of the present disclosure provide a method for sending a VxLAN packet, a computer device, and a computer readable medium, to resolve a problem that a network adapter cannot forward a VxLAN packet.

According to a first aspect of the embodiments of the present disclosure, a method for sending VxLAN packet is provided, where the method is applied to a computer device, and the computer device includes a central processing unit, a network adapter, and a virtual machine, and the network adapter includes a network adapter processor; and the method includes:

receiving, by the network adapter processor, a first packet sent by the virtual machine;

determining, by the network adapter processor, whether the network adapter stores encapsulation information required for performing VxLAN encapsulation on the first packet, where the encapsulation information includes an encapsulation MAC address and an encapsulation IP address, the encapsulation MAC address is a MAC address of a next-hop device passed through when the first packet is sent, and the encapsulation IP address is an IP address of a virtual extensible local area network tunnel end point (VTEP) on a destination end of the first packet; and when the network adapter stores the encapsulation information required for performing VxLAN encapsulation on the first packet, performing VxLAN encapsulation on the first packet according to the encapsulation information, and sending the first packet; or when the network adapter does not store the encapsulation information required for performing VxLAN encapsulation on the first packet, sending an obtaining request to the central processing unit, obtaining the encapsulation information from the central processing unit and storing the encapsulation information, and sending a packet obtained after VxLAN encapsulation is performed on the first packet.

The network adapter includes at least one physical function (PF) and at least one virtual function (VF), and the virtual machine in the computer device directly sends a packet to the network adapter using the VF and sends the packet over a network. Optionally, each virtual machine in the computer device is uniquely corresponding to one VF, and the virtual machine forwards a packet to the network adapter using the unique corresponding VF.

In this method embodiment, after receiving a first packet, the network adapter processor determines whether a network adapter stores encapsulation information required for performing VxLAN encapsulation on the first packet; if the network adapter stores the encapsulation information, performs VxLAN encapsulation on the first packet and sends the first packet; if the network adapter does not store the encapsulation information, requests the encapsulation information from a central processing unit and stores the encapsulation information; and sends a packet obtained after the VxLAN encapsulation is performed on the first packet, such that the network adapter implements the VxLAN encapsulation and the sending of the received packet.

With reference to the first aspect of the embodiments of the present disclosure, in a first possible implementation of the first aspect of the embodiments of the present disclosure, before the determining whether the network adapter stores encapsulation information required for performing VxLAN encapsulation on the first packet, the method further includes:

obtaining, by the network adapter processor from the received first packet, an ID of a VF for forwarding the first packet, and querying, according to the ID of the VF, for a VF attribute corresponding to the ID of the VF; and obtaining a VNI of the VF when the VF attribute is a VxLAN attribute.

After obtaining the VNI of the VF, the network adapter processor may search an address forwarding table in the network adapter according to the VNI of the VF and an inner destination MAC address of the first packet, and determine whether the address forwarding table includes encapsulation information corresponding to the VNI of the VF and the inner destination MAC address of the first packet.

With reference to the first possible implementation of the first aspect of the embodiments of the present disclosure, in a second possible implementation of the first aspect of the embodiments of the present disclosure, the determining, by the network adapter processor, whether the network adapter stores encapsulation information required for performing VxLAN encapsulation on the first packet includes:

querying, by the network adapter processor according to the VNI and an inner destination MAC address of the first packet, whether the network adapter includes encapsulation information corresponding to the VNI of the VF and the inner destination MAC address of the first packet; and determining that the network adapter stores the encapsulation information required for performing VxLAN encapsulation on the first packet when the network adapter includes the encapsulation information corresponding to the VNI of the VF and the inner destination MAC address of the first packet.

In this embodiment of the present disclosure, a quantity of times of finding encapsulation information by a network adapter may further be recorded. Each time the encapsulation information is successfully found, the recorded quantity of times is increased by 1. In this way, a record of encapsulation information used for a lowest quantity of times may be deleted when storage space of the network adapter is limited, such that a record of encapsulation information newly delivered by the central processing unit may be added. When the storage space of the network adapter is limited, a latest entry may be stored, and efficiency of forwarding a packet by the network adapter is improved.

With reference to any one of the first aspect, or the first or the second possible implementation of the first aspect of the embodiments of the present disclosure, in a third possible implementation of the first aspect of the embodiments of the present disclosure, a manner of storing, by the network adapter, the encapsulation information required for performing VxLAN encapsulation on the first packet includes:

storing, by the network adapter, a correspondence between a tunnel identifier, and the VNI of the VF for forwarding the first packet and the inner destination MAC address of the first packet, and storing a correspondence between the tunnel identifier and the encapsulation information.

Optionally, the network adapter may directly store a correspondence between the encapsulation information, and the VNI of the VF for forwarding the first packet and the inner destination MAC address of the first packet.

With reference to any one of the first aspect, or the first to the third possible implementations of the first aspect of the embodiments of the present disclosure, in a fourth possible implementation of the first aspect of the embodiments of the present disclosure, the sending, by the network adapter processor, a packet obtained after the VxLAN encapsulation is performed on the first packet includes:

receiving and sending, by a virtual switch in the network adapter, the packet that is sent by the central processing unit and that is obtained after the VxLAN encapsulation is performed on the first packet; or performing, by the network adapter processor, VxLAN encapsulation on the first packet according to the obtained encapsulation information required for performing VxLAN encapsulation on the first packet, and sending the first packet using a virtual switch in the network adapter.

When the virtual switch in the network adapter receives and sends the packet that is sent by the central processing unit and that is obtained after the VxLAN encapsulation is performed on the first packet, after sending the first packet and the VNI to the central processing unit, the network adapter does not need to store the first packet, such that storage space that is of the network adapter and that is occupied for storing the first packet can be saved, and utilization of storage space of the network adapter can be improved.

With reference to any one of the first aspect, or the first to the fourth possible implementations of the first aspect of the embodiments of the present disclosure, in a fifth possible implementation of the first aspect of the embodiments of the present disclosure, the method further includes:

receiving, by the network adapter, a second packet sent to the virtual machine, where the second packet is a VxLAN packet;

determining, by the network adapter processor, whether the network adapter stores an encapsulation MAC address and an encapsulation IP address in the second packet; and sending the second packet to the central processing unit when the network adapter does not store the encapsulation MAC address and the encapsulation IP address in the second packet.

Optionally, the related encapsulation IP address and encapsulation MAC address in the central processing unit may also be stored in the central processing unit by means of pre-configuration by an administrator.

With reference to any one of the first aspect, or the first to the fifth possible implementations of the first aspect of the embodiments of the present disclosure, in a sixth possible implementation of the first aspect of the embodiments of the present disclosure, the network adapter supports single-root input/output virtualization (SR-IOV) and supports a forwarding function of the virtual switch (vSwitch). In addition, the network adapter is connected to the central processing unit using a PCIe link.

According to a second aspect of the embodiments of the present disclosure, a computer device is provided, including a central processing unit, a network adapter, and a virtual machine, where the network adapter includes a network adapter processor, and the network adapter processor includes a packet processing unit and an entry management unit; where the packet processing unit is configured to: receive a first packet sent by the virtual machine; determine whether the network adapter stores encapsulation information required for performing VxLAN encapsulation on the first packet; and when the network adapter does not store the encapsulation information required for performing VxLAN encapsulation on the first packet, send an obtaining request to the central processing unit, where the encapsulation information includes an encapsulation MAC address and an encapsulation IP address, the encapsulation MAC address is a MAC address of a next-hop device passed through when the first packet is sent, and the encapsulation IP address is an IP address of a VTEP on a destination end of the first packet;

the entry management unit is configured to receive and store the encapsulation MAC address and the encapsulation IP address that are sent by the central processing unit and that are required for performing VxLAN encapsulation on the first packet; and the network adapter processor is configured to send a packet obtained after VxLAN encapsulation is performed on the first packet.

The network adapter includes at least one PF and at least one VF, and the virtual machine directly sends a packet to the network adapter using the VF and sends the packet over a network. Optionally, the virtual machine is uniquely corresponding to one VF, and the virtual machine forwards a packet to the network adapter using the unique corresponding VF.

With reference to the second aspect of the embodiments of the present disclosure, in a first possible implementation of the second aspect of the embodiments of the present disclosure, the central processing unit includes a packet receiving unit and an obtaining and sending unit; where the packet receiving unit is configured to receive the obtaining request sent by the packet processing unit, where the obtaining request includes the first packet and a VNI of a VF for forwarding the first packet; and the obtaining and sending unit is configured to: obtain, according to the obtaining request received by the packet receiving unit, the encapsulation information required for performing VxLAN encapsulation on the first packet, and send the encapsulation information to the entry management unit.

In the computer device, the packet processing unit receives a first packet sent by the virtual machine; determines whether the network adapter stores encapsulation information required for performing VxLAN encapsulation on the first packet; if the network adapter stores the encapsulation information, performs VxLAN encapsulation on the first packet and send the first packet; or if the network adapter does not store the encapsulation information, requests the encapsulation information from a central processing unit and stores the encapsulation information; and sends a packet obtained after the VxLAN encapsulation is performed on the first packet, such that the network adapter implements the VxLAN encapsulation and the sending of the received packet.

With reference to the second aspect or the first possible implementation of the second aspect of the embodiments of the present disclosure, in a second possible implementation of the second aspect of the embodiments of the present disclosure, the packet processing unit is further configured to: obtain, from the received first packet, an ID of the VF for forwarding the first packet; query, according to the ID of the VF, for a VF attribute corresponding to the ID of the VF; and obtain the VNI of the VF when the VF attribute is a VxLAN attribute.

The packet processing unit may query, according to the obtained VNI of the VF and an inner destination MAC address of the first packet, whether the network adapter stores the encapsulation information required for performing VxLAN encapsulation on the first packet.

With reference to the second possible implementation of the second aspect of the embodiments of the present disclosure, in a third possible implementation of the second aspect of the embodiments of the present disclosure, the packet processing unit is configured to querie, according to the VNI and an inner destination MAC address of the first packet, whether the network adapter includes encapsulation information corresponding to the VNI of the VF and the inner destination MAC address of the first packet; and determine that the network adapter includes the encapsulation information required for performing VxLAN encapsulation on the first packet when the network adapter includes the encapsulation information corresponding to the VNI of the VF and the inner destination MAC address of the first packet.

Further, the packet processing unit may further record a quantity of times of finding encapsulation information. Each time the encapsulation information is successfully found, the recorded of times is increased by 1. In this way, when storage space of the network adapter is limited, a record of encapsulation information used for a lowest quantity of times may be deleted, such that a record of encapsulation information newly delivered by the central processing unit may be added. When the storage space of the network adapter is limited, a latest entry may be stored, and efficiency of forwarding a packet by the network adapter is improved.

With reference to any one of the second aspect, or the first to the third possible implementations of the second aspect of the embodiments of the present disclosure, in a fourth possible implementation of the second aspect of the embodiments of the present disclosure, the entry management unit is configured to store a correspondence between a tunnel identifier, and the VNI of the VF for forwarding the first packet and the inner destination MAC address of the first packet, and store a correspondence between the tunnel identifier and the encapsulation information.

Optionally, the entry management unit may directly store a correspondence between the encapsulation information, and the VNI of the VF for forwarding the first packet and the inner destination MAC address of the first packet.

With reference to any one of the second aspect, or the first to the fourth possible implementations of the second aspect of the embodiments of the present disclosure, in a fifth possible implementation of the second aspect of the embodiments of the present disclosure, the network adapter processor further includes a virtual switch; and the packet processing unit in the network adapter processor performs VxLAN encapsulation on the first packet according to the encapsulation MAC address and the encapsulation IP address that are obtained by the entry management unit, and sends the first packet using the virtual switch; or the virtual switch in the network adapter processor receives and sends the packet that is sent by the central processing unit and that is obtained after the VxLAN encapsulation is performed on the first packet.

When the virtual switch in the network adapter receives and sends the packet that is sent by the central processing unit and that is obtained after the VxLAN encapsulation is performed on the first packet, and after the packet processing unit sends the first packet and the VNI to the central processing unit, the network adapter does not need to store the first packet, such that storage space that is of the network adapter and that is occupied for storing the first packet can be saved, and utilization of storage space of the network adapter can be improved.

With reference to any one of the second aspect, or the first to the fifth possible implementations of the second aspect of the embodiments of the present disclosure, in a sixth possible implementation of the second aspect of the embodiments of the present disclosure, the packet processing unit is further configured to: receive a second packet sent to the virtual machine, where the second packet is a VxLAN packet; determine whether entry management unit stores an encapsulation MAC address and an encapsulation IP address in the second packet; and when the entry management unit does not store the encapsulation MAC address and the encapsulation IP address in the second packet, send the second packet to the packet receiving unit; and the obtaining and sending unit is further configured to: receive the second packet from the packet receiving unit, and obtain the encapsulation MAC address and the encapsulation IP address in the second packet.

Optionally, the related encapsulation IP address and encapsulation MAC address in the central processing unit may also be stored in the central processing unit by means of pre-configuration by an administrator.

With reference to any one of the second aspect, or the first to the sixth possible implementations of the second aspect of the embodiments of the present disclosure, in a seventh possible implementation of the second aspect of the embodiments of the present disclosure, the network adapter supports SR-IOV and supports a forwarding function of the vSwitch. In addition, the network adapter is connected to the central processing unit using a PCIe link.

According to a third aspect in the embodiments of the present disclosure, a computer readable medium is provided, where the computer readable medium stores a computer readable instruction, and when the computer readable instruction is executed by a processor in a computer device, the processor is configured to:

receive a first packet sent by a virtual machine to a network adapter;

determine whether the network adapter stores encapsulation information required for performing VxLAN encapsulation on the first packet, where the encapsulation information includes an encapsulation MAC address and an encapsulation IP address, the encapsulation MAC address is a MAC address of a next-hop device passed through when the first packet is sent, and the encapsulation IP address is an IP address of a VTEP on a destination end of the first packet; and when the network adapter stores the encapsulation information required for performing VxLAN encapsulation on the first packet, perform VxLAN encapsulation on the first packet according to the encapsulation MAC address and the encapsulation IP address, and send the first packet; or when the network adapter does not store the encapsulation information required for performing VxLAN encapsulation on the first packet, send an obtaining request to a central processing unit in the computer device, obtain the encapsulation information from the central processing unit and store the encapsulation information, and send a packet obtained after VxLAN encapsulation is performed on the first packet.

The network adapter includes at least one PF and at least one VF, and the virtual machine in the computer device directly sends a packet to the network adapter using the VF and sends the packet over a network. Optionally, each virtual machine in the computer device is uniquely corresponding to one VF, and the virtual machine forwards a packet to the network adapter using the unique corresponding VF.

In the embodiment of the computer readable medium, after receiving a first packet, a processor determines whether a network adapter stores encapsulation information required for performing VxLAN encapsulation on the first packet; if the network adapter stores the encapsulation information, performs VxLAN encapsulation on the first packet and sends the first packet; if the network adapter does not store the encapsulation information, requests the encapsulation information from a central processing unit and stores the encapsulation information; and sends a packet obtained after the VxLAN encapsulation is performed on the first packet, such that the network adapter implements the VxLAN encapsulation and the sending of the received packet.

With reference to the third aspect of the embodiments of the present disclosure, in a first possible implementation of the third aspect of the embodiments of the present disclosure, before the processor determines whether the network adapter stores the encapsulation information required for performing VxLAN encapsulation on the first packet, the processor is further configured to:

obtain, from the received first packet, an ID of a VF for forwarding the first packet, and query, according to the ID of the VF, for a VF attribute corresponding to the ID of the VF; and obtain a VNI of the VF when the VF attribute is a VxLAN attribute.

After the VNI of the VF is obtained, the processor may search an address forwarding table in the network adapter according to the VNI of the VF and an inner destination MAC address of the first packet, and determine whether the address forwarding table includes encapsulation information corresponding to the VNI of the VF and the inner destination MAC address of the first packet.

With reference to the third aspect or the first possible implementation of the third aspect of the embodiments of the present disclosure, in a second possible implementation of the third aspect of the embodiments of the present disclosure, the processor is further configured to:

obtain the VxLAN network identifier VNI of the VF for forwarding the first packet;

query, according to the VNI and an inner destination MAC address of the first packet, whether the network adapter includes encapsulation information corresponding to the VNI of the VF and the inner destination MAC address of the first packet; and determine that the network adapter includes the encapsulation information required for performing VxLAN encapsulation on the first packet when the network adapter includes the encapsulation information corresponding to the VNI of the VF and the inner destination MAC address of the first packet.

In this embodiment of the present disclosure, the processor may further record, according to the computer readable instruction in the computer readable medium, a quantity of times of finding the encapsulation information. Each time the encapsulation information is successfully found, the recorded quantity of times is increased by 1. In this way, when storage space of the network adapter is limited, a record of encapsulation information used for a lowest quantity of times may be deleted, such that a record of encapsulation information newly delivered by the central processing unit may be added. When the storage space of the network adapter is limited, a latest entry may be stored, and efficiency of forwarding a packet by the network adapter is improved.

With reference to any one of the third aspect, or the first to the second possible implementations of the third aspect of the embodiments of the present disclosure, in a third possible implementation of the third aspect of the embodiments of the present disclosure, a manner of storing the encapsulation information required for performing VxLAN encapsulation on the first packet includes:

storing a correspondence between a tunnel identifier, and the VNI of the VF for forwarding the first packet and the inner destination MAC address of the first packet, and storing a correspondence between the tunnel identifier and the encapsulation information. Optionally, a correspondence between the encapsulation information, and the VNI of the VF for forwarding the first packet and the inner destination MAC address of the first packet may be directly stored.

With reference to any one of the third aspect, or the first to the third possible implementations of the third aspect of the embodiments of the present disclosure, in a fourth possible implementation of the third aspect of the embodiments of the present disclosure, the processor is further configured to:

receive and send the packet that is sent by the central processing unit and that is obtained after the VxLAN encapsulation is performed on the first packet; or perform VxLAN encapsulation on the first packet according to the obtained encapsulation information required for performing VxLAN encapsulation on the first packet, and send the first packet.

When the processor receives and sends the packet that is sent by the central processing unit and that is obtained after the VxLAN encapsulation is performed on the first packet, and after the processor sends the first packet and the VNI to the central processing unit, the processor does not need to store the first packet, such that storage space that is of the network adapter and that is occupied for storing the first packet can be saved, and utilization of storage space of the network adapter can be improved.

With reference to any one of the third aspect, or the first to the fourth possible implementations of the third aspect of the embodiments of the present disclosure, in a fifth possible implementation of the third aspect of the embodiments of the present disclosure, the processor is further configured to:

receive a second packet sent to the virtual machine, where the second packet is a VxLAN packet;

determine whether the network adapter stores an encapsulation MAC address and an encapsulation IP address in the second packet; and send the second packet to the central processing unit when the network adapter does not store the encapsulation MAC address and the encapsulation IP address in the second packet.

According to the method for encapsulating and forwarding a VxLAN packet, the computer device, and the computer readable medium that are provided in the embodiments of the present disclosure, after receiving a first packet, a network adapter determines whether the network adapter stores encapsulation information required for performing VxLAN encapsulation on the first packet; if the network adapter stores the encapsulation information, performs VxLAN encapsulation on the first packet and sends the first packet; or if the network adapter does not store the encapsulation information, requests the encapsulation information from a central processing unit and stores the encapsulation information; and sends a packet obtained after the VxLAN encapsulation is performed on the first packet, such that the network adapter implements the VxLAN encapsulation and the sending of the received packet.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are a part rather than all of the embodiments of the present disclosure. All other embodiments obtained by a person of ordinary skill in the art based on the embodiments of the present disclosure without creative efforts shall fall within the protection scope of the present disclosure.

Figure 1:
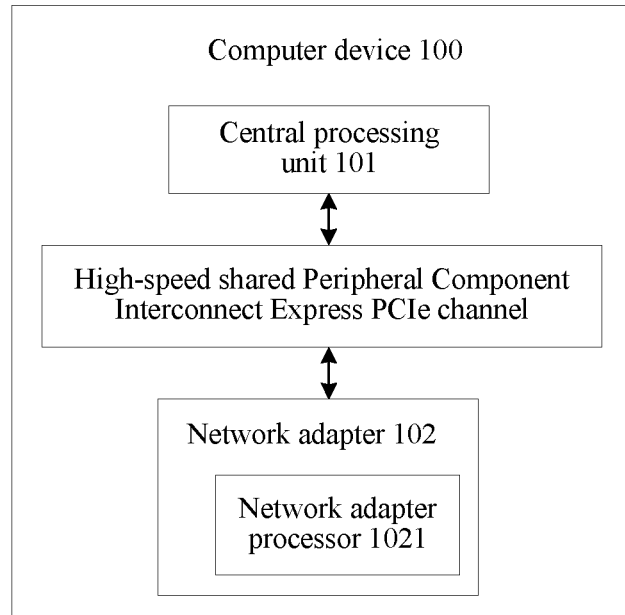
FIG. 1 is a schematic structural diagram of a computer device.

Referring to FIG. 1, FIG. 1 is a schematic structural diagram of a computer device 100. The computer device 100 includes a central processing unit 101 and a network adapter 102, and the network adapter 102 includes a network adapter processor 1021. The network adapter 102 supports a forwarding function of a vSwitch, supports a single-root input/output virtualization (SR-IOV) function, and can forward a VLAN packet based on the vSwitch.

That the network adapter supports the forwarding function of the vSwitch indicates that a VLAN packet is forwarded on the network adapter. The vSwitch is also referred to as a virtual network switch, works on a layer 2 data network, and implements a layer 2 (and part of a layer 3) network function of a physical switch in a software manner. Compared with a conventional physical switch, the virtual switch has advantages of flexible configuration and good extensibility. Dozens or even hundreds of virtual switches may be configured on an ordinary server, and a quantity of ports may be flexibly selected. In addition, the virtual switch usually can achieve, by means of virtual switching, performance that only a large physical switch can achieve. The vSwitch is widely applied to an Internet service that is based on an infrastructure as a service (IaaS). A virtual machine (VM) is connected to a network using the vSwitch, and the vSwitch uses a physical network adapter on a physical host as an uplink to connect to an external network. The same as the physical switch, each vSwitch includes a quantity of ports. A set of virtual ports vPorts with the same feature is a virtual local area network VLAN. Packets in different VLANs are mutually isolated in transmission, and a user in each VLAN cannot directly communicate with a user in another VLAN.

That the network adapter supports an SR-IOV function indicates that the network adapter presents plurality virtual network adapters for a computer device (such as a server) on which the network adapter is located. The SR-IOV is a virtualization solution based on hardware and can improve performance and scalability. According to an SR-IOV standard, a Peripheral Component Interconnect Express (PCIe) device is allowed to be shared between virtual machines at a high speed. According to the SR-IOV specification, a single input/output (I/O) resource may be shared by plurality virtual machines. The sharing device is provided with a dedicated resource and further uses a shared common resource. In this way, each virtual machine can access a unique resource. Therefore, a PCIe device (such as a network adapter) that enables SR-IOV and has appropriate hardware and is supported by an OS may be presented as plurality separate physical devices, and each VM has its own PCIe configuration space.

The SR-IOV specification defines two function types: a PF and a VF. The PF is a full-function PCIe function and can be discovered, managed, and processed like any other PCIe device. The PF has a full-configuration resource and can be used to configure or control the PCIe device. The VF is a function related to the physical function PF. The VF may share one or more physical resources with the physical function and another VF related to the same physical function. The VF is allowed to have only a configuration resource used for the VF. When the network adapter is connected to another component in the computer device using a PCIe link, the network adapter presents plurality virtual PCIe network adapters for the computer device on which the network adapter is located. The plurality virtual PCIe network adapters are hardware virtual network adapters, and the hardware virtual network adapters may be allocated to a common virtual machine on the computer device for using and allocated to a management virtual machine on the computer device for using. The network adapter is connected to the management virtual machine using a PF port and connected to the common virtual machine using a VF port. The management virtual machine is configured to manage the common virtual machine.

It should be noted that, when the network adapter supports the SR-IOV function, a computer device on which the network adapter is located needs to reserve a bus resource and reserve a BAR (base address register) resource for the network adapter when scanning a BIOS (basic input/output system), and a kernel of an operating system of the computer device needs to support a function for enabling SR-IOV In an SR-IOV mode, a to-be-sent packet of the virtual machine is directly forwarded using the network adapter. When VxLAN encapsulation needs to be performed on the to-be-sent packet of the virtual machine and the packet needs to be sent, the network adapter 102 in the computer device 100 does not have a capability for forwarding a VxLAN packet and cannot effectively forward the packet.

An embodiment of the present disclosure provides a new computer device to resolve a problem that a network adapter cannot encapsulate and send a VxLAN packet.

The VxLAN packet includes a VxLAN tunnel header and an original payload. The VxLAN tunnel header includes an outer destination MAC address, an outer source MAC address, an outer destination IP address, an outer source IP address, an outer UDP header, a VNI, and the like; and the original payload includes an inner destination MAC address, an inner source MAC address, inner 802.1Q, an original Ethernet valid payload, and the like. The outer destination MAC address is a MAC address of a next-hop device passed through when the VxLAN packet is forwarded, that is, an encapsulation MAC address; and the outer destination IP address is an IP address of a virtual extensible local area network tunnel end point (VTEP) on a destination end for forwarding the VxLAN packet, that is, an encapsulation IP address. The next-hop device passed through when the VxLAN packet is forwarded is a next device passed through when the VxLAN packet is forwarded. For example, when the network adapter forwards the VxLAN packet to a destination device only through a route device 1 and a route device 2, the route device 1 is the next-hop device passed through when the network adapter forwards the VxLAN packet.

When VxLAN encapsulation is performed on a packet sent by the virtual machine, the outer source MAC address and the outer source IP address in the VxLAN tunnel header are statically configured by an administrator when the administrator deploys the VTEP. Another field in an outer IP header, and the outer UDP header may be encapsulated according to meanings of fields in the IP and UDP protocols when being encapsulated. The VNI is configured on a VF corresponding to the virtual machine, and the original payload is an original packet sent by the virtual machine.

Usually, the VxLAN packet is forwarded by setting the VTEP, and the VTEP isolates a virtual network from a physical network. A data frame of the virtual network is transmitted over the physical network by establishing a tunnel between VTEPs, and the physical network does not sense the virtual network. As a proxy, the VTEP may be implemented in plurality manners, may be implemented by system hardware and software in a cooperative manner, and functions to perform VxLAN encapsulation on the to-be-sent packet and perform parsing, learning, decapsulation, and the like on a received VxLAN packet. A network including plurality computer devices may be logically considered as a VxLAN tunnel established between plurality VTEPs.

The VTEP encapsulates the original payload into a tunnel header. The tunnel header uses a UDP format and identifies that a packet is of a VxLAN type using a destination port number of the UDP. IP information in the encapsulated tunnel header is IP address information of a local end VTEP and IP address information of a peer end VTEP to which a packet is to be sent. A source MAC address in the encapsulated tunnel header is a MAC address of a local end VTEP. A destination MAC address is a MAC address of a next-hop device from a local end VTEP to a peer end VTEP, that is, a MAC address of a next-hop device passed through when the VxLAN packet is forwarded. For an intermediate device in network transmission, the intermediate device performs forwarding according to only network information of the VTEP and does not need to parse the VNI and inner packet information.

Figure 2:
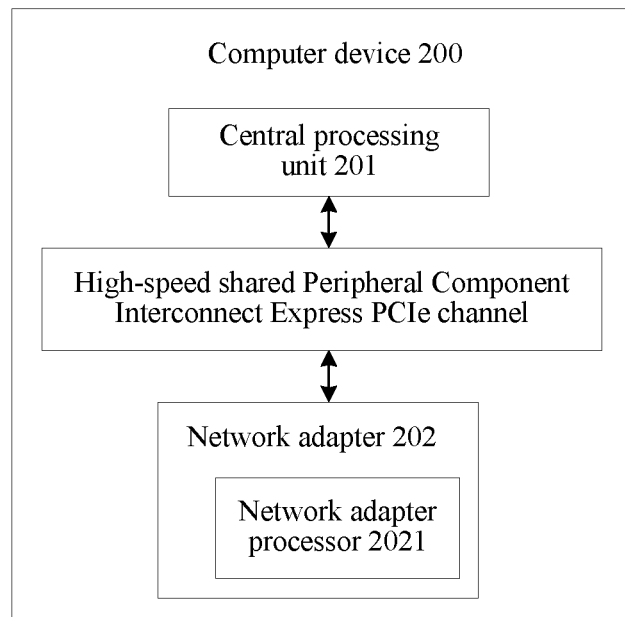
FIG. 2 is a schematic structural diagram of a computer device 200 according to an embodiment of the present disclosure.

Referring to FIG. 2, FIG. 2 is a schematic structural diagram of a computer device 200 according to an embodiment of the present disclosure. As shown in FIG. 2, the computer device 200 includes a central processing unit 201 and a network adapter 202, and the network adapter 202 includes a network adapter processor 2021.

In this embodiment of the present disclosure, the network adapter 202 implements data encapsulation and decapsulation and a forwarding function of the VTEP, such that the network adapter implements encapsulation and forwarding of a VxLAN packet. That is, when receiving a packet sent by a virtual machine, the network adapter 202 obtains an encapsulation MAC address and an encapsulation IP address that are required for performing VxLAN encapsulation on the packet, performs VxLAN encapsulation on the packet according to the encapsulation MAC address and the encapsulation IP address, and sends the packet.

A manner in which the network adapter 202 obtains the encapsulation MAC address and the encapsulation IP address includes: the network adapter 202 sends an obtaining request to the central processing unit 201 for a to-be-sent packet and requests an encapsulation MAC address and an encapsulation IP address of the to-be-sent packet. That is, when the network adapter 202 does not store the encapsulation MAC address and the encapsulation IP address that are related to the to-be-sent packet, the network adapter 202 sends information about the to-be-forwarded packet to the central processing unit 201. After obtaining the encapsulation MAC address and the encapsulation IP address that are required by the to-be-sent packet, the central processing unit 201 sends the obtained encapsulation MAC address and encapsulation IP address to the network adapter 202. The network adapter 202 stores the obtained encapsulation MAC address and encapsulation IP address, and encapsulates the to-be-forwarded packet according to the obtained encapsulation MAC address and encapsulation IP address and sends the packet. The network adapter 202 may further forward, according to the stored encapsulation information (the encapsulation MAC address and the encapsulation IP address), a subsequently received packet that has the same destination MAC address and the same VNI of a forwarding VF as the to-be-forwarded packet. In this embodiment of the present disclosure, a forwarding VF is a VF that forwards, to the network adapter, a packet sent by a virtual machine. Each virtual machine is corresponding to a VF. When sending a packet to the network adapter for forwarding, the virtual machine sends the packet to the network adapter using a VF corresponding to the virtual machine.

With reference to a structure of the computer device 200 shown in FIG. 2, the following describes a process of sending a VxLAN packet in this embodiment of the present disclosure using an example in which the network adapter 202 encapsulates and sends a VxLAN packet.

When a virtual machine in the computer device 200 needs to send a packet to another device, the virtual machine sends the to-be-sent packet to the network adapter 202. A process in which the network adapter 202 processes the received packet is as follows.

S100. The network adapter 202 receives a first packet sent by a virtual machine.

The first packet received by the network adapter 202 is a packet sent by a virtual machine on the computer device 200. In an SR-IOV mode, the virtual machine on the computer device 200 sends the first packet using a VF corresponding to the virtual machine, that is, a forwarding VF of the virtual machine sends the first packet to the network adapter 202.

S102. The network adapter processor 2021 in the network adapter 202 obtains a VNI corresponding to a VF for forwarding the first packet.

The network adapter processor 2021 may obtain an ID of the VF for forwarding the first packet, search a VF configuration table according to the obtained ID of the VF, and obtain a VF attribute and a VTAG (when the VF attribute is a VLAN, the VTAG indicates a VLAN ID; or when the VF attribute is a VxLAN, the VTAG indicates a VNI). If the VF attribute is the VxLAN, a VNI corresponding to the ID of the VF is the VNI of the VF. Content of the VF configuration table may be shown in Table a.

TABLE a

| Entry name | Entry description | Input/Output |
| --- | --- | --- |
| VF ID | ID number of a VF | In |
| VF attribute | VLAN/VxLAN attribute of a VF | Out |
| VTAG | VLAN ID or VNI of a VF | Out |

In this embodiment of the present disclosure, Table a lists only entry content related to this solution. The VTAG is an identifier corresponding to the ID of the VF and the VF attribute and has no specific meaning.

The first packet received by the network adapter 202 carries the ID of the VF for forwarding the first packet. When the network adapter 202 receives the first packet, the network adapter processor 2021 may learn which VF the first packet is sent from. In addition, a configuration table of each VF includes information identifying whether a VF attribute is a VLAN type or a VxLAN type. If the VF attribute is a VLAN type, a VTAG in the configuration table of the VF indicates a VLAN ID corresponding to the VF; or if the VF attribute is a VxLAN type, a VTAG in the configuration table of the VF indicates a VNI corresponding to the VF. The network adapter processor 2021 determines, according to the obtained ID of the VF in the first packet, whether a VF attribute corresponding to the ID of the VF is a VxLAN attribute; and obtains a corresponding VNI from the configuration table of the VF if the VF attribute corresponding to the ID of the VF is the VxLAN attribute.

It should be noted that, a VF attribute used by a virtual machine is usually configured when a network adapter is initialized. For example, an administrator configures a VF attribute used by a virtual machine as a VxLAN when the network adapter is initialized. In addition, a VNI is preconfigured, and each VF whose attribute is the VxLAN is corresponding to a unique VNI.

S104. The network adapter processor 2021 determines, according to the obtained VNI of the VF and an inner destination MAC address of the first packet, whether the network adapter 202 stores an encapsulation MAC address and an encapsulation IP address that are required for performing VxLAN encapsulation on the first packet, where the encapsulation MAC address is a MAC address of a next-hop device passed through when the first packet is sent, and the encapsulation IP address is an IP address of a VTEP on a destination end of the first packet.

The network adapter processor 2021 may search, according to the obtained VNI of the VF for forwarding the first packet and the inner destination MAC address of the first packet, the network adapter 202 (such as a storage unit or a storage entry of the network adapter 202) for an encapsulation MAC address and an encapsulation IP address that are corresponding to the VNI of the VF for forwarding the first packet and the destination MAC address of the first packet; and if the encapsulation MAC address and the encapsulation IP address can be found, determine that the network adapter 202 stores the encapsulation MAC address and the encapsulation IP address that are required for performing VxLAN encapsulation on the first packet. In this embodiment of the present disclosure, the inner destination MAC address is a destination MAC address in an original packet (that is, an original payload).

S106. When the network adapter 202 does not store the encapsulation MAC address and the encapsulation IP address that are required for performing VxLAN encapsulation on the first packet, send a request message to the central processing unit 201 to request the encapsulation MAC address and the encapsulation IP address that are required for performing VxLAN encapsulation on the first packet, where the request message carries the first packet and the VNI of the VF for forwarding the first packet.

S108. The network adapter processor 2021 obtains the encapsulation MAC address and the encapsulation IP address that are sent by the central processing unit 201 and that are required for performing VxLAN encapsulation on the first packet, sends a packet obtained after the VxLAN encapsulation is performed on the first packet, and stores the encapsulation MAC address and the encapsulation IP address.

That the network adapter processor 2021 sends a packet obtained after the VxLAN encapsulation is performed on the first packet may include:

the network adapter processor 2021 performs VxLAN encapsulation on the first packet according to the obtained encapsulation MAC address and encapsulation IP address required for performing VxLAN encapsulation on the first packet, and sends the encapsulated packet; or the network adapter processor 2021 receives the packet that is sent by the central processing unit 201 and that is obtained after the VxLAN encapsulation is performed on the first packet, and sends the packet obtained after the VxLAN encapsulation is performed on the first packet.

Optionally, the network adapter processor 2021 further includes a virtual switch. That the network adapter processor 2021 sends a packet obtained after the VxLAN encapsulation is performed on the first packet may include:

the network adapter processor 2021 performs VxLAN encapsulation on the first packet according to the obtained encapsulation MAC address and encapsulation IP address required for performing VxLAN encapsulation on the first packet, and sends the encapsulated packet using the virtual switch; or the virtual switch in the network adapter processor 2021 receives the packet that is sent by the central processing unit 201 and that is obtained after the VxLAN encapsulation is performed on the first packet, and sends the packet obtained after the VxLAN encapsulation is performed on the first packet.

The network adapter processor 2021 requests, from the central processing unit 201, the encapsulation MAC address and the encapsulation IP address that are required for performing VxLAN encapsulation on the first packet, and can perform VxLAN encapsulation on the first packet according to the obtained encapsulation MAC address and encapsulation IP address and send the first packet. The network adapter processor 2021 stores the encapsulation MAC address and the encapsulation IP address, such that when receiving a packet that has the same inner destination MAC address and the same VNI of a forwarding VF as the first packet, the network adapter 202 can perform VxLAN encapsulation on the subsequently received packet according to the obtained encapsulation MAC address and encapsulation IP address and send the packet.

In this embodiment of the present disclosure, the network adapter processor 2021 may perform VxLAN encapsulation on the first packet, or the central processing unit 201 may perform VxLAN encapsulation on the first packet. When the central processing unit 201 performs encapsulation, after the network adapter processor 2021 sends the central processing unit 201 the first packet and the VNI of the VF for forwarding the first packet, to obtain the encapsulation MAC address and the encapsulation IP address, the network adapter processor 2021 does not need to buffer the first packet, such that memory space of the network adapter 202 can be saved, and utilization of the memory space of the network adapter 202 can be improved.

In this embodiment of the present disclosure, that the network adapter 202 stores, using an address information table, the encapsulation MAC address and the encapsulation IP address that are required for performing VxLAN encapsulation on the first packet can be implemented in plurality manners. The encapsulation MAC address and the encapsulation IP address may be recorded in one table, or may be recorded in two tables. This embodiment of the present disclosure imposes no limitation on a format of a table for recording a correspondence, provided that the network adapter processor 2021 in the network adapter 202 can obtain, according to the table, an encapsulation MAC address and an encapsulation IP address that are corresponding to a destination MAC address of a to-be-encapsulated packet. The following separately uses one table and two tables to describe a manner in which the network adapter 202 stores the encapsulation MAC address and the encapsulation IP address that are required for performing VxLAN encapsulation on the first packet.

When using one table, as shown in Table 1, the network adapter 202 records, in one table, a VNI and an inner packet destination MAC address, and an encapsulation MAC address and an encapsulation IP address that are corresponding to the VNI and the inner packet destination MAC address. Table 1 is shown in the following:

TABLE 1

| Entry name | Entry description | Input/Output |
| --- | --- | --- |
| VNI | VNI | In |
| Destination MAC address | Destination MAC address | In |
| Encapsulation MAC address | Outer encapsulation destination MAC address | Out |
| Encapsulation IP address | Outer encapsulation destination IP address | Out |

When using two tables, the network adapter 202 may use one table to record a VNI of a forwarding VF and an inner destination MAC address, and use the other table to record an encapsulation MAC address and an encapsulation IP address. An association between the two tables is established using an identifier (such as a tunnel ID). A correspondence between the tunnel ID (an example in which the identifier is a tunnel ID is used for description), and the VNI of the forwarding VF and the inner destination MAC address may be shown in Table 2.

TABLE 2

| Entry name | Entry description | Input/Output |
| --- | --- | --- |
| VNI | VNI | In |
| Destination MAC address | Destination MAC address | In |
| Forwarding egress | Tunnel ID | Out |

A correspondence between the tunnel ID, and the encapsulation MAC address and the encapsulation IP address is shown in Table 3.

TABLE 3

| Entry name | Entry description | Input/Output |
| --- | --- | --- |
| Tunnel ID | Tunnel ID | In |
| Encapsulation MAC | Outer encapsulation destination | Out |

TABLE 3-continued

| Entry name | Entry description | Input/Output |
|---|---|---|
| address | MAC address | |
| Encapsulation IP address | Outer encapsulation destination IP address | Out |

Table 3 is a linear table, and "tunnel ID" is used as an entry index. Each entry in Table 3 stores encapsulation information, including the encapsulation MAC address and the encapsulation IP address. Each time a new entry is added, an unused tunnel ID is occupied. For example, it is assumed that Table 3 may store 1024 entries, and a value range of the tunnel ID is 0 to 1023. All entry content (the encapsulation MAC address and the encapsulation IP address) in initialization is empty, and each time a piece of encapsulation information needs to be stored, one entry is occupied.

Two tables are used to record a correspondence between the VNI of the forwarding VF and the inner destination MAC address, and the encapsulation MAC address and the encapsulation IP address, such that storage space of the network adapter 202 is saved and it is avoided that excessive correspondence tables occupy the storage space of the network adapter 202. For example, for more than two packets, VNIs of forwarding VFs and inner destination MAC addresses of the packets may be different while encapsulation MAC addresses and encapsulation IP addresses may be the same. By establishing a correspondence using a tunnel ID as an index, only one encapsulation MAC address and one encapsulation IP address may be stored. For each combination of a VNI of a forwarding VF and an inner destination MAC address, a corresponding encapsulation MAC address and encapsulation IP address can be obtained according to a tunnel ID of the combination. This avoids storing an encapsulation MAC address and an encapsulation IP address for each group of a VNI of a forwarding VF and an inner destination MAC address, and accordingly saves storage space that is of the network adapter and that is occupied for storing each encapsulation MAC address and encapsulation IP address.

In this embodiment of the present disclosure, Table 2 may be a MAC address forwarding table. In a further implementation, the existing MAC address forwarding table may be expanded, that is, the forwarding egress in the MAC address forwarding table is expanded, and information about the tunnel ID is added. An expanded MAC address forwarding table is shown in Table 4.

TABLE 4

| Entry name | Entry description | Input/Output |
|---|---|---|
| VTAG | VNI or VLAN ID | In |
| Destination MAC address | Destination MAC address | In |
| Forwarding egress | Virtual machine network port or physical port or tunnel ID (for a packet on which VxLAN encapsulation needs to be performed) | Out |

Table 4 records the forwarding egress corresponding to the VTAG (the VTAG may be a VLAN ID of the existing MAC table or a VNI in the present disclosure) and the destination MAC address. The forwarding egress includes the virtual machine network port, the physical port, or the tunnel ID. When the network adapter 202 has forwarded a packet that has the same inner destination MAC address and the same VNI of the forwarding VF as the to-be-forwarded packet (for example, the first packet), the network adapter processor 2021 records a corresponding tunnel ID in the MAC address forwarding table. That is, if the forwarding egress in the MAC address forwarding table includes a tunnel ID, it indicates that the network adapter has forwarded a packet having the same inner destination MAC address and the same VNI of the forwarding VF.

Table 3 may be a VTEP information table. The VTEP information table is created by the network adapter 202. When the network adapter 202 has forwarded a packet that has the same inner destination MAC address and the same VNI of the forwarding VF as the to-be-forwarded packet, the network adapter 202 creates a VTEP information table including a tunnel ID.

In this embodiment of the present disclosure, Table 2, Table 3, the MAC address forwarding table, and the VTEP information table only list information strongly related to this embodiment of the present disclosure. In a further implementation, the MAC address forwarding table and the VTEP information table may further include other information, and this embodiment of the present disclosure imposes no further limitation.

For example, Table 2 is a MAC address forwarding table, and Table 3 is a VTEP information table. When the network adapter 202 uses two tables to record the correspondence between the inner destination MAC address and the VNI of the forwarding VF, and the encapsulation MAC address and the encapsulation IP address, step S104 in which the network adapter processor 2021 determines, according to the obtained VNI of the forwarding VF for forwarding the first packet and the inner destination MAC address of the first packet, whether the network adapter 202 stores the encapsulation MAC address and the encapsulation IP address that are required for encapsulating the first packet includes:

the network adapter processor 2021 searches for a MAC address forwarding table according to the obtained VNI corresponding to the VF for forwarding the first packet and the inner destination MAC address of the first packet, and determines whether there is a MAC address forwarding table related to the obtained VNI of the VF for forwarding the first packet and the inner destination MAC address of the first packet; and if the MAC address forwarding table related to the VNI of the VF for forwarding the first packet and the inner destination MAC address of the first packet is found, and a forwarding egress in the found MAC address forwarding table is a tunnel ID, the network adapter processor 2021 obtains the corresponding tunnel ID, searches for a VTEP information table according to the obtained tunnel ID, and obtains an encapsulation MAC address and an encapsulation IP address that are recorded in the VTEP information table and that are corresponding to the tunnel ID.

In step S106, the network adapter 202 sends the request message to the central processing unit 201 to request the encapsulation MAC address and the encapsulation IP address that are required for performing VxLAN encapsulation on the first packet. A manner in which the central processing unit 201 obtains the encapsulation MAC address and the encapsulation IP address may be: the central processing unit 201 searches for a corresponding forwarding database (FDB) entry according to the received VNI of the forwarding VF and the inner destination MAC address of the first packet, and obtains, from the found FDB entry, the encapsulation IP address for performing VxLAN encapsulation on the first packet; and searches for an ARP entry according to the obtained encapsulation IP address, and obtains the encapsulation MAC address for performing VxLAN encapsulation on the first packet.

After obtaining the encapsulation IP address and the encapsulation MAC address for performing VxLAN encapsulation on the first packet, the central processing unit 201 may directly send the obtained encapsulation IP address and encapsulation MAC address to the network adapter 202; or may generate a VTEP information table including the encapsulation IP address and the encapsulation MAC address, and send the generated VTEP information table to the network adapter 202.

Figure 3:
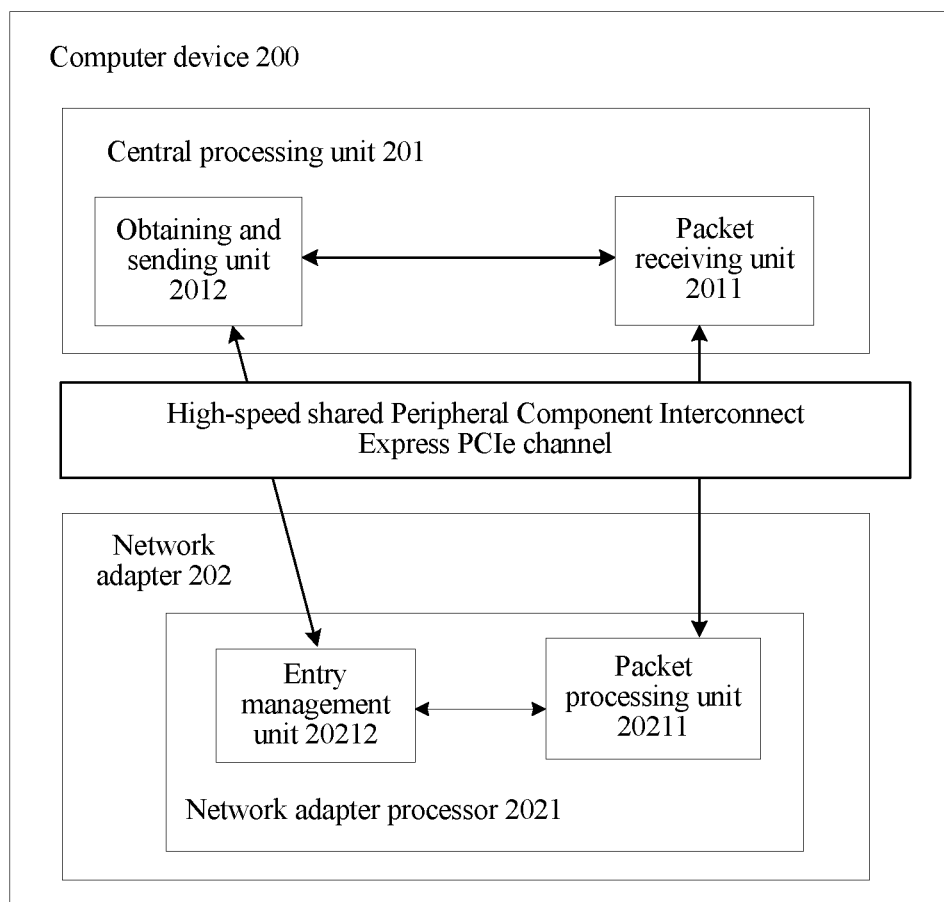
FIG. 3 is a schematic structural diagram of a specific implementation of a computer device 200 according to an embodiment of the present disclosure.

Referring to FIG. 3, FIG. 3 is a schematic structural diagram of a further implementation of the computer device 200 according to this embodiment of the present disclosure. As shown in FIG. 3, the network adapter processor 2021 includes a packet processing unit 20211 and an entry management unit 20212. The central processing unit 201 includes a packet receiving unit 2011 and an obtaining and sending unit 2012. The central processing unit 201 is connected to the network adapter 202 using a high-speed shared Peripheral Component Interconnect Express PCIe channel.

The packet processing unit 20211 is configured to: determine, according to the received first packet, an attribute of a VF for sending the first packet; if the VF attribute is a VxLAN attribute, obtain a VNI of the VF for forwarding the first packet; determine, according to the obtained VNI of the forwarding VF and an inner destination MAC address of the first packet, whether the network adapter 202 stores an encapsulation MAC address and an encapsulation IP address that are required for encapsulating the first packet; and when the network adapter 202 does not store the encapsulation MAC address and the encapsulation IP address that are required for encapsulating the first packet, send a request message to the packet receiving unit 2011 in the central processing unit 201 to request the encapsulation MAC address and the encapsulation IP address that are required for performing VxLAN encapsulation on the first packet.

The entry management unit 20212 is configured to receive and store the encapsulation MAC address and the encapsulation IP address that are sent by the central processing unit 201 and that are required for performing VxLAN encapsulation on the first packet. Further, the entry management unit 20212 receives the encapsulation MAC address and the encapsulation IP address from the obtaining and sending unit 2012 in the central processing unit 201 and stores the encapsulation MAC address and the encapsulation IP address. Correspondingly, the packet processing unit 20211 may perform VxLAN encapsulation on the first packet according to the encapsulation MAC address and the encapsulation IP address that are obtained by the entry management unit 20212, and send the first packet. The packet processing unit 20211 may further perform, according to the encapsulation MAC address and the encapsulation IP address that are obtained by the entry management unit 20212, VxLAN encapsulation on a packet that has the same inner destination MAC address and the same VNI of the forwarding VF as the first packet, and send the packet.

For different application environments, there are different implementations in which the central processing unit 201 obtains, according to the request of the network adapter processor 2021, the encapsulation MAC address and the encapsulation IP address that are required for performing VxLAN encapsulation on the first packet. For example, implementations used when the computer device 200 runs a Windows operating system and runs a Linux operating system are slightly different. In this embodiment of the present disclosure, an example in which the computer device 200 runs the Linux operating system is used to describe the manner in which the central processing unit 201 obtains the encapsulation MAC address and the encapsulation IP address that are required for performing VxLAN encapsulation on the first packet.

Figure 4:
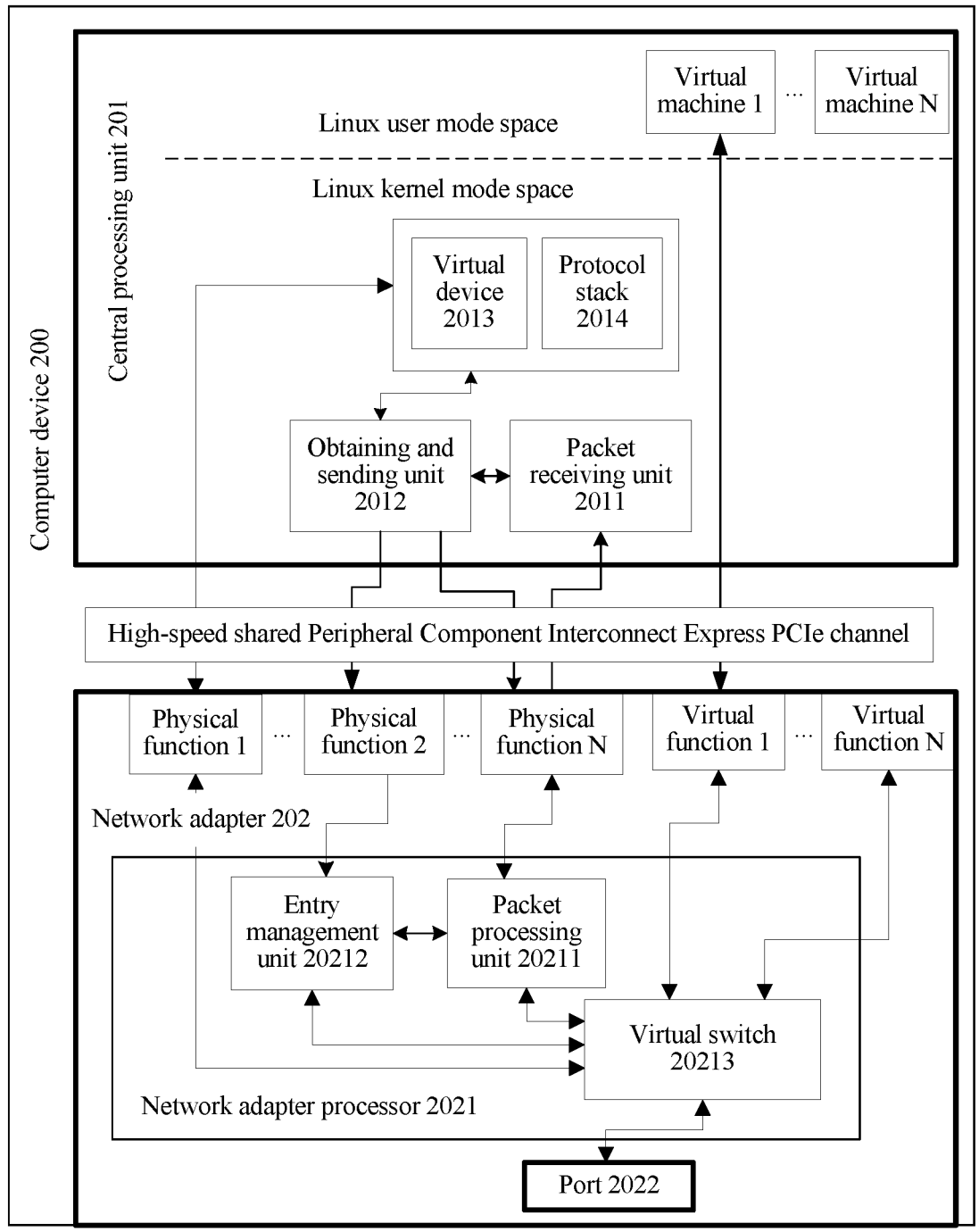
FIG. 4 is a schematic structural diagram of a specific implementation of a computer device 200 in a Linux running environment according to an embodiment of the present disclosure.

Referring to FIG. 4, FIG. 4 is a schematic structural diagram of a further implementation of the computer device 200 in a Linux running environment according to this embodiment of the present disclosure. A network adapter 202 in FIG. 4 supports a forwarding function of a vSwitch and supports an SR-IOV function. The network adapter 202 includes at least one PF and at least one VF. The network adapter 202 is connected to the central processing unit 201 using a PCIe channel, and is connected to a network using a port 2022. A processor 2021 in the network adapter 202 includes a packet processing unit 20211, an entry management unit 20212, and a virtual switch 20213. The central processing unit 201 runs a Linux operating system, and a process of running the Linux operating system includes running Linux user mode space and Linux kernel mode space. The Linux user mode space runs at least one virtual machine, and each virtual machine is connected to the virtual switch 20213 in the network adapter 202 using a unique VF. The Linux kernel mode space includes a packet receiving unit 2011, an obtaining and sending unit 2012, a virtual device 2013, and a protocol stack 2014.

When the packet receiving unit 2011 in the central processing unit 201 receives a VNI of a forwarding VF and the first packet that are sent by the packet processing unit 20211 in the network adapter processor 2021, the obtaining and sending unit 2012 searches, according to the VNI received by the packet receiving unit 2011, a Linux device linked list for a VxLAN device (the VxLAN device is a virtual device, for example, may be a virtual device created using a VxLAN function of the Linux operating system) corresponding to the VNI; searches, according to an inner destination MAC address of the first packet, an FDB table in data space of the VxLAN device for a corresponding FDB entry (each VxLAN device has exclusive data space, and the data space stores an FDB entry related to the device); and searches the FDB entry according to the MAC address to obtain an encapsulation IP address corresponding to the inner destination MAC address, that is, an IP address of a VTEP on a destination end. The FDB table may be shown in Table 5.

TABLE 5

| Entry name | Entry description | Input/Output |
|---|---|---|
| Destination MAC address | Destination MAC address | in |
| Encapsulation IP address | IP address of a VTEP on a destination end | out |

After obtaining the encapsulation IP address (that is, the IP address of the VTEP on the destination end), the obtaining and sending unit 2012 uses the encapsulation IP address as a destination IP address for encapsulating the first packet, and searches an ARP entry (the ARP entry records a correspondence between the encapsulation IP address and a MAC address of a next-hop device passed through) in the protocol stack 2014 to obtain the MAC address that is corresponding to the encapsulation IP address and that is of the next-hop device passed through when the first packet is sent, so as to obtain complete information required for performing VxLAN encapsulation on the first packet. The ARP entry may be shown in Table 6.

TABLE 6

| Entry name | Entry description | Input/Output |
|---|---|---|
| IP address | Outer encapsulation destination IP address in the present disclosure | in |
| MAC address | Outer encapsulation destination MAC address in the present disclosure | out |

When sending the obtained encapsulation MAC address and encapsulation IP address to the network adapter 202, the obtaining and sending unit 2012 may convert the encapsulation MAC address and the encapsulation IP address into a form that can be stored in the network adapter 202, for example, a MAC address forwarding table and a VTEP information table, and then send the converted encapsulation MAC address and encapsulation IP address to the network adapter 202; or may directly send the encapsulation MAC address and the encapsulation IP address to the network adapter 202.

In addition, the obtaining and sending unit 2012 may send, to the protocol stack 2014, the first packet and encapsulation information (which includes but is not limited to a source IP address, the destination IP address, a source MAC address, the destination MAC address, and the VNI, where the source IP address and the source MAC address are statically configured by an administrator). The protocol stack 2014 implements VxLAN encapsulation of the first packet according to the encapsulation information, and sends the encapsulated VxLAN packet to the network adapter 202. The network adapter 202 sends the encapsulated VxLAN packet.

The obtained encapsulation MAC address is obtained by the central processing unit 201 from the ARP entry. Therefore, when the VxLAN encapsulation information is statically configured by the administrator, the administrator needs to configure only the encapsulation IP address, and does not need to configure the encapsulation MAC address (the encapsulation MAC address changes when the next-hop device changes and is dynamically maintained by a host ARP). In this way, configuration by the administrator is simpler, and networking is more flexible.

It should be noted that Table 5 and Table 6 in this embodiment of the present disclosure only list information related to the present disclosure for concision. In a further implementation, the tables may further include other information, and this embodiment of the present disclosure imposes no limitation.

In this embodiment of the present disclosure, the network adapter 202 further manages the received or stored encapsulation MAC address and encapsulation IP address. In an example in which the network adapter 202 stores the encapsulation MAC address and the encapsulation IP address using the MAC address forwarding table and the VTEP information table, each time the network adapter 202 finds that the MAC address forwarding table is used to encapsulate a VxLAN packet, a quantity of times of using the MAC address forwarding table is increased by 1. When the network adapter 202 receives the MAC address forwarding table delivered by the central processing unit 201 and storage space of the MAC address forwarding table is full, the network adapter 202 may actively age (that is, delete) an entry with the lowest using frequency, so as to insert a newly delivered entry, thereby ensuring that the network adapter 202 stores only a forwarding entry with the highest using frequency when space of the network adapter 202 is limited. The MAC address forwarding table is in a one-to-one correspondence with the VTEP information table on the network adapter, and creating of the VTEP information table and updating of a quantity of times of using the VTEP information table follow a corresponding MAC address entry, such that an entry with a high using frequency can be continuously kept on the network adapter, space utilization of a network adapter and management efficiency of an entry may be further improved, and efficiency of forwarding a VxLAN packet by the network adapter is improved. A quantity of times of using an entry in the MAC address forwarding table may be recorded in the MAC address forwarding table, and a quantity of times of using an entry in the VTEP information table may be recorded in the VTEP information table; or quantities of times of using entries in the MAC address forwarding table and the VTEP information table may be independently recorded using an entry. This embodiment of the present disclosure imposes no limitation.

In an example of an architecture of a computer device shown in FIG. 4, the following describes a procedure of a method for sending a VxLAN packet in this embodiment of the present disclosure. When a virtual machine 1 needs to send a first packet, the virtual machine 1 sends the packet to the network adapter 202 using a VF (this embodiment of the present disclosure uses a VF 1 as an example for description) corresponding to the virtual machine 1. The virtual switch 20213 in the network adapter 202 receives, from the VF 1, the first packet sent by the virtual machine 1, and sends the first packet to the packet processing unit 20211. The packet processing unit 20211 determines, according to the obtained first packet, whether an attribute of the VF 1 is a VxLAN attribute; and if the attribute is a VxLAN attribute, queries whether the entry management unit 20212 stores an encapsulation MAC address and an encapsulation IP address that are required for performing VxLAN encapsulation on the first packet.

If the entry management unit 20212 includes the encapsulation MAC address and the encapsulation IP address that are required for performing VxLAN encapsulation on the first packet, the packet processing unit 20211 performs VxLAN encapsulation on the first packet according to the encapsulation MAC address and the encapsulation IP address in the entry management unit 20212, sends the first packet obtained after the VxLAN encapsulation to the port 2022 using the virtual switch 20213, and sends, using the port 2022, the first packet obtained after the VxLAN encapsulation over a network.

If the entry management unit 20212 does not include the encapsulation MAC address and the encapsulation IP address that are required for performing VxLAN encapsulation on the first packet, the packet processing unit 20211 sends, using a PF (this embodiment of the present disclosure uses a PF N as an example for description), the first packet and a VNI of the VF 1 to the packet receiving unit 2011 in the central processing unit 201. The packet receiving unit 2011 sends the received first packet and the VNI of the VF 1 to the obtaining and sending unit 2012. The obtaining and sending unit 2012 obtains, by searching an FDB entry and an ARP entry, the encapsulation MAC address and the encapsulation IP address that are required for performing VxLAN encapsulation on the first packet, and sends, using a PF (a PF 2 is used as an example for description), the encapsulation MAC address and the encapsulation IP address to the entry management unit 20212. The entry management unit 20212 stores the encapsulation MAC address and the encapsulation IP address that are obtained from the obtaining and sending unit 2012. When the central processing unit 201 performs VxLAN encapsulation on the first packet, the protocol stack 2014 may perform VxLAN encapsulation on the first packet, and sends the first packet obtained after the VxLAN encapsulation to the virtual switch 20213 using the PF (this embodiment of the present disclosure uses a PF 1 as an example for description). The virtual switch 20213 sends the first packet obtained after the VxLAN encapsulation to the network using the port 2022. When VxLAN encapsulation is to be performed on the first packet using the network adapter, the obtaining and sending unit 2012 sends the first packet to the packet processing unit 20211 using the PF (for example, the PF N). The packet processing unit 20211 performs VxLAN encapsulation on the first packet according to the encapsulation MAC address and the encapsulation IP address that are stored by the entry management unit 20212, and sends, using the virtual switch 20213, the first packet obtained after the VxLAN encapsulation to the network using the port 2022.

In this embodiment of the present disclosure, an FDB entry in the computer device 200 has two sources: configuration by an administrator, and learning of a VxLAN packet sent by a network adapter. If all FDB entries are configured by the administrator, when the computer device 200 receives, from the network, a packet whose destination is a virtual machine on the computer device 200, because a forwarding entry is statically configured by the administrator and delivered to the network adapter 202, the network adapter 202 may forward an original payload to the destination virtual machine according to the configured forwarding entry after decapsulating the received VxLAN packet and obtaining the inner original payload. If an FDB forwarding entry is obtained by learning the VxLAN packet, after receiving a VxLAN packet whose destination is a virtual machine on the computer device, the network adapter 202 needs to determine whether the network adapter includes VTEP information and MAC address forwarding information that are included in the packet. If the network adapter does not include the VTEP information and the MAC address forwarding information that are included in the packet, the network adapter sends the VxLAN packet to the central processing unit 201 for VxLAN packet learning. In this way, regardless of whether administrator configuration or packet learning is used, all entries on the network adapter are from the computer device 200 (that is, the central processing unit 201 in the computer device 200), and the computer device 200 can be managed in a centralized manner.

In this embodiment of the present disclosure, with reference to the computer device 200 shown in FIG. 4, a process in which the network adapter 202 sends the VxLAN packet to the central processing unit 201 for VxLAN packet learning is as follows.

S200. The network adapter 202 receives a second packet that is sent, over the network, to the computer device 200, where a destination of the second packet is a virtual machine on the computer device.

S202. The network adapter processor 2021 in the network adapter 202 determines whether the second packet is a VxLAN packet.

Whether the second packet is a VxLAN packet may be determined by determining whether a UDP destination port number used in the second packet is 4789. If the UDP destination port number is 4789, it can be determined that the second packet is the VxLAN packet. According to a stipulation of RFC 7348, the UDP port number 4789 is used as an identifier of the VxLAN packet.

S204. When the second packet is the VxLAN packet, the network adapter processor 2021 parses the second packet to obtain a VNI, a source MAC address and a destination MAC address that are of an inner packet (an original payload), and a source MAC address and a source IP address that are of an outer packet (a VxLAN tunnel); and determines whether the network adapter 202 includes an encapsulation MAC address (the source MAC address of the outer packet) and an encapsulation IP address (the source IP address of the outer packet) that are corresponding to the second packet. If the network adapter 202 does not include the encapsulation MAC address and the encapsulation IP address that are corresponding to the second packet, the second packet is forwarded to the central processing unit 201; and if the network adapter 202 includes the encapsulation MAC address and the encapsulation IP address that are corresponding to the second packet, directly jump to S210.

In an example in which the network adapter records the encapsulation IP address and the encapsulation MAC address using the VTEP information table and the MAC address forwarding table, when determining whether the network adapter 202 includes the encapsulation MAC address and the encapsulation IP address that are included in the second packet, the network adapter 202 first searches for the MAC address forwarding table according to the VNI of the second packet and the source MAC address of the inner packet. If the MAC address forwarding table can be found, it indicates that the network adapter 202 includes the MAC address forwarding table corresponding to the second packet. The network adapter 202 searches for the VTEP information table according to a tunnel ID indicated in the found MAC address forwarding table, and compares an encapsulation IP address and an encapsulation MAC address in the found VTEP information table with the source IP address and the source MAC address that are of the outer packet and that are obtained by parsing the second packet. If the two are the same, it indicates that the network adapter 202 includes the encapsulation IP address and the encapsulation MAC address that are included in the second packet. If there is no VTEP information table or the two are different, it is determined that the network adapter 202 does not include the encapsulation IP address and the encapsulation MAC address that are included in the second packet.

S206. After receiving the second packet sent by the virtual switch 20213, the central processing unit 201 parses the second packet, and in an example of an embodiment shown in FIG. 4, may parse the packet in the protocol stack 2014; if it is determined that the parsed packet is a VxLAN packet, learns the VxLAN packet; and if an FDB entry already exists, refreshes the FDB entry and updates the encapsulation IP address; or if no FDB entry exists, creates an FDB entry, such that the FDB entry can be used when VxLAN encapsulation is performed on a packet subsequently sent by a virtual machine in the computer device 200.

S208. The obtaining and sending unit 2012 of the central processing unit 201 obtains a decapsulated VxLAN original payload, and delivers the original payload and the VNI to the network adapter 202. That is, the obtaining and sending unit 2012 sends, using a PF, the obtained original payload and VNI of the second packet to the packet processing unit 20211 in the network adapter processor 202.

It should be noted that the obtaining and sending unit 2012 may use plurality methods to obtain the decapsulated original payload. In an example of a computer device running a Linux operating system, a corresponding VxLAN device for processing the VxLAN packet is connected to a virtual bridge established by the Linux. In this way, the decapsulated original payload is forwarded to the virtual bridge, and the obtaining and sending unit 2012 may obtain the original payload on an ingress of the virtual bridge. Certainly, a receiving and processing procedure of the VxLAN device may be modified, and after the VxLAN device completes packet learning and decapsulation, the original payload is obtained.

S210. The network adapter 202 searches for a forwarding table according to the VNI and the inner destination MAC address of the second packet, and forwards the inner original payload to a corresponding virtual machine. That is, the packet processing unit 20211 in the network adapter processor 2021 sends the second packet to a destination virtual machine according to the VNI and the inner destination MAC address of the second packet using the virtual switch 20213.

In step S204, after sending the second packet to the central processing unit 201, the packet processing unit 20211 in the network adapter processor 2021 may directly send the second packet to the destination virtual machine according to the VNI and the inner destination MAC address of the second packet using the virtual switch 20213. The obtaining and sending unit 2012 in the central processing unit 201 does not need to send the original payload and the VNI of the second packet to the packet processing unit 20211 in the network adapter processor 202 using the PF.

Figure 5:
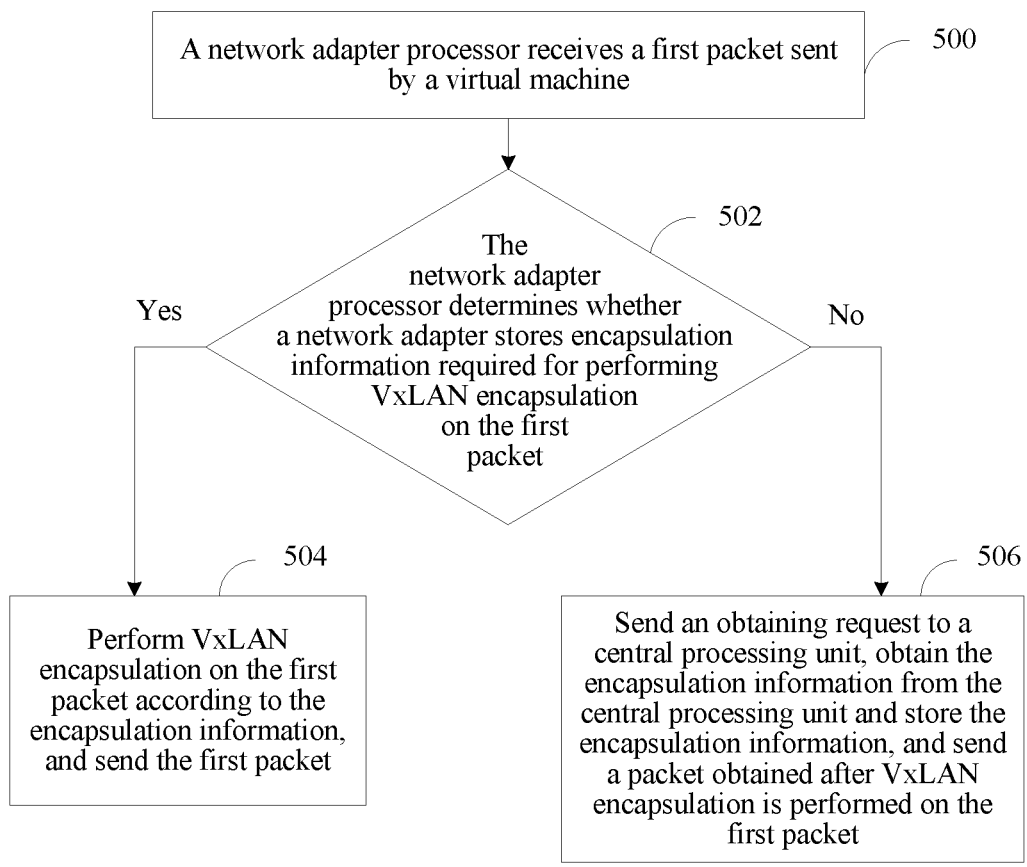
FIG. 5 is a schematic flowchart of a method for sending a virtual extensible local area network VxLAN packet according to an embodiment of the present disclosure.

Referring to FIG. 5, FIG. 5 is a schematic flowchart of a method for sending a virtual extensible local area network VxLAN packet according to an embodiment of the present disclosure. The method for sending a virtual extensible local area network VxLAN packet in this embodiment of the present disclosure is applied to a computer device, the computer device includes a central processing unit, a network adapter, and a virtual machine, and the network adapter includes a network adapter processor. As shown in FIG. 5, the method includes the following steps:

Step 500: The network adapter processor receives a first packet sent by the virtual machine.

Step 502: The network adapter processor determines whether the network adapter stores encapsulation information required for performing VxLAN encapsulation on the first packet, where the encapsulation information includes an encapsulation Media Access Control MAC address and an encapsulation Internet Protocol IP address, the encapsulation MAC address is a MAC address of a next-hop device passed through when the first packet is sent, and the encapsulation IP address is an IP address of a VTEP on a destination end of the first packet.

Step 504: When the network adapter stores the encapsulation information required for performing VxLAN encapsulation on the first packet, perform VxLAN encapsulation on the first packet according to the encapsulation information, and send the first packet.

Step 506: When the network adapter does not store the encapsulation information required for performing VxLAN encapsulation on the first packet, send an obtaining request to the central processing unit, obtain the encapsulation information from the central processing unit and store the encapsulation information, and send a packet obtained after the VxLAN encapsulation is performed on the first packet.

The network adapter is a network adapter that supports single-root input/output virtualization SR-IOV and supports a forwarding function of a vSwitch. The virtual machine in the computer device directly sends a packet to the network adapter using a VF and sends the packet over a network. Correspondingly, the network adapter includes at least one PF and at least one VF.

In this method embodiment, after receiving a first packet, the network adapter processor determines whether a network adapter stores encapsulation information required for performing VxLAN encapsulation on the first packet; if the network adapter stores the encapsulation information, performs VxLAN encapsulation on the first packet and sends the first packet; if the network adapter does not store the encapsulation information, requests the encapsulation information from a central processing unit and stores the encapsulation information; and sends a packet obtained after the VxLAN encapsulation is performed on the first packet, such that the network adapter implements the VxLAN encapsulation and the sending of the received packet.

Optionally, before step 502, the method further includes:

Step 501: The network adapter processor obtains, from the received first packet, an ID of a VF for forwarding the first packet, and queries, according to the ID of the VF, a VF attribute corresponding to the ID of the VF.

When the VF attribute is a VxLAN attribute, a VxLAN network identifier VNI of the VF is obtained.

Correspondingly, that the network adapter processor determines whether the network adapter stores encapsulation information required for performing VxLAN encapsulation on the first packet includes:

the network adapter processor queries, according to the VNI and an inner destination MAC address of the first packet, whether the network adapter includes encapsulation information corresponding to the VNI of the VF and the inner destination MAC address of the first packet; and when the network adapter includes the encapsulation information corresponding to the VNI of the VF and the inner destination MAC address of the first packet, determines that the network adapter stores the encapsulation information required for performing VxLAN encapsulation on the first packet.

Optionally, the network adapter may query, by searching a related address information table (which may be Table 1, or may be Table 2 and Table 3), whether the network adapter stores the encapsulation information required for performing VxLAN encapsulation on the first packet. In addition, the network adapter may further record a quantity of times of using the address information table. Each time the network adapter searches the address information table and finds encapsulation information required for performing VxLAN encapsulation on a packet that needs to be forwarded, the recorded quantity of times of using the recorded address information table is increased by 1. In this way, when entries of the address information table in the network adapter fully occupy available storage space of the network adapter, an entry used for a lowest quantity of times may be deleted, such that an entry newly delivered by the central processing unit may be added. When the storage space of the network adapter is limited, a latest entry may be stored, and efficiency of forwarding a packet by the network adapter is improved.

A manner in which the network adapter stores the encapsulation information required for performing VxLAN encapsulation on the first packet may be a manner of Table 1, or may be a manner of Table 2 and Table 3. For example, a MAC forwarding table is used to store a correspondence between a tunnel identifier, and the VNI of the VF for forwarding the first packet and the inner destination MAC address of the first packet; and a VTEP information table is used to store a correspondence between the tunnel identifier and the encapsulation information. In the manner of Table 2 and Table 3 (or the MAC forwarding table and the VTEP information table), the storage space of the network adapter can be saved, and it is avoided that excessive entries occupy the storage space of the network adapter.

In the method embodiment shown in FIG. 5, the network adapter in the computer device may further include a virtual switch. Correspondingly, that the network adapter processor sends a packet obtained after the VxLAN encapsulation is performed on the first packet includes:

the virtual switch in the network adapter receives and sends the packet that is sent by the central processing unit and that is obtained after the VxLAN encapsulation is performed on the first packet; or the network adapter processor performs VxLAN encapsulation on the first packet according to the obtained encapsulation information required for performing VxLAN encapsulation on the first packet, and sends the first packet using the virtual switch in the network adapter.

When the virtual switch in the network adapter receives and sends the packet that is sent by the central processing unit and that is obtained after the VxLAN encapsulation is performed on the first packet, the network adapter does not need to store the first packet, such that storage space that is of the network adapter and that is occupied for storing the first packet can be saved, and utilization of storage space of the network adapter can be improved.

When the network adapter receives a second packet that is sent from a network side to a virtual machine in the computer device, the method further includes:

the network adapter receives the second packet sent to the virtual machine, where the second packet is a VxLAN packet; and the network adapter processor determines whether the network adapter stores an encapsulation MAC address and an encapsulation IP address in the second packet, and when the network adapter does not store the encapsulation MAC address and the encapsulation IP address in the second packet, sends the second packet to the central processing unit.

After the network adapter processor sends the second packet to the central processing unit, the central processing unit may obtain and store the encapsulation MAC address and the encapsulation IP address in the second packet according to the received second packet, for example, store the encapsulation IP address in an FDB entry, and record the encapsulation MAC address in an ARP entry. The central processing unit stores the encapsulation MAC address and the encapsulation IP address in the second packet; and when subsequently receiving an obtaining request of the network adapter that requests encapsulation information of a packet that has the same VNI and inner destination MAC address as the second packet, sends the encapsulation information to the network adapter according to the stored encapsulation MAC address and encapsulation IP address in the second packet. Optionally, the related encapsulation IP address and encapsulation MAC address in the central processing unit may also be stored in the central processing unit by means of pre-configuration by an administrator.

For the embodiment that implements the method for forwarding a VxLAN packet, reference may be made to the solution described in the embodiment related to FIG. 2, FIG. 3, or FIG. 4, and details are not described herein.

Figure 6:
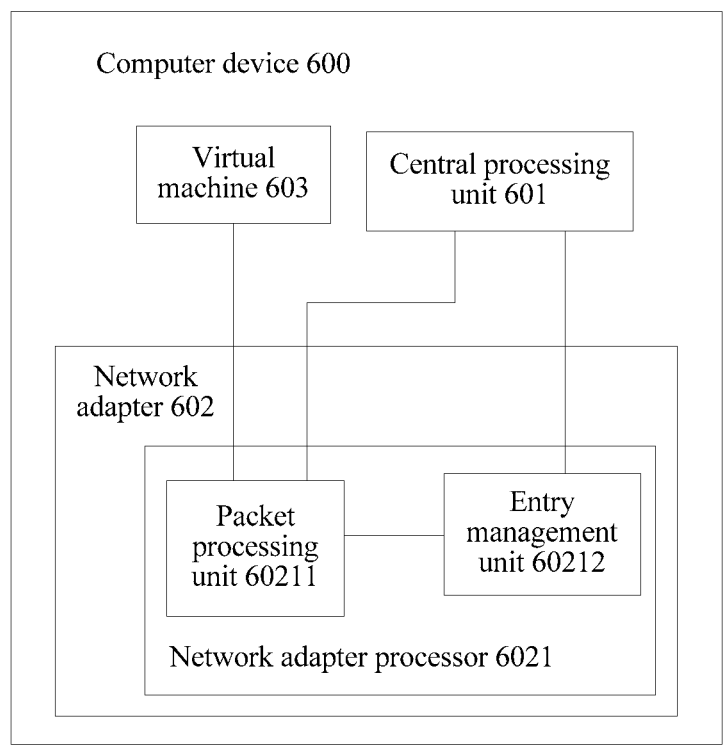
FIG. 6 is a schematic structural diagram of a computer device 600 according to an embodiment of the present disclosure.

Referring to FIG. 6, FIG. 6 is a schematic structural diagram of a computer device 600 according to an embodiment of the present disclosure. As shown in FIG. 6, the computer device 600 includes a central processing unit 601, a network adapter 602, and a virtual machine 603. The network adapter 602 includes a network adapter processor 6021, and the network adapter processor 6021 includes a packet processing unit 60211 and an entry management unit 60212.

The packet processing unit 60211 is configured to: receive a first packet sent by the virtual machine 603; determine whether the network adapter 602 stores encapsulation information required for performing VxLAN encapsulation on the first packet; and when the network adapter 602 does not store the encapsulation information required for performing VxLAN encapsulation on the first packet, send an obtaining request to the central processing unit 601. The encapsulation information includes an encapsulation MAC address and an encapsulation IP address, the encapsulation MAC address is a MAC address of a next-hop device passed through when the first packet is sent, and the encapsulation IP address is an IP address of a VTEP on a destination end of the first packet.

The entry management unit 60212 is configured to receive and store the encapsulation MAC address and the encapsulation IP address that are sent by the central processing unit 601 and that are required for performing VxLAN encapsulation on the first packet.

The network adapter processor 6021 is configured to send a packet obtained after the VxLAN encapsulation is performed on the first packet.

The network adapter 602 supports single-root input/output virtualization SR-IOV and supports a forwarding function of a vSwitch. The virtual machine 603 in the computer device 600 directly sends a packet to the network adapter 602 using a VF and sends the packet over a network. Correspondingly, the network adapter includes at least one PF and at least one VF. The network adapter 602 is connected to the central processing unit 601 using a PCIe link.

In the computer device 600, the packet processing unit 60211 receives a first packet sent by the virtual machine 603; determines whether the network adapter 602 stores encapsulation information required for performing VxLAN encapsulation on the first packet; if the network adapter 602 stores the encapsulation information, performs VxLAN encapsulation on the first packet and send the first packet; or if the network adapter does not store the encapsulation information, requests the encapsulation information from a central processing unit 601 and stores the encapsulation information; and sends a packet obtained after the VxLAN encapsulation is performed on the first packet, such that the network adapter 602 implements VxLAN encapsulation and sending of the received packet.

Figure 7:
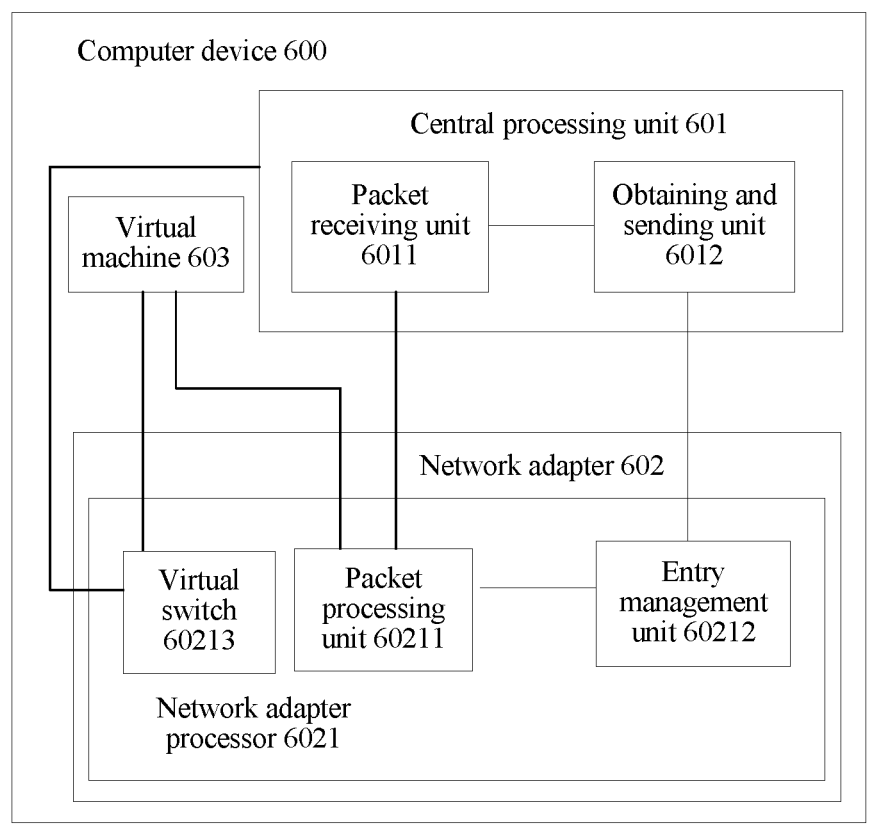
FIG. 7 is a schematic structural diagram of a specific implementation of a computer device 600 according to an embodiment of the present disclosure.

Referring to FIG. 7, FIG. 7 is a schematic structural diagram of a further implementation of the computer device 600 according to an embodiment of the present disclosure. As shown in FIG. 7, the central processing unit 601 includes a packet receiving unit 6011 and an obtaining and sending unit 6012.

The packet receiving unit 6011 is configured to receive the obtaining request sent by the packet processing unit 60211. The obtaining request includes the first packet and a VNI of a VF for forwarding the first packet.

The obtaining and sending unit 6012 is configured to: obtain, according to the obtaining request received by the packet receiving unit 6011, the encapsulation information required for performing VxLAN encapsulation on the first packet, and send the encapsulation information to the entry management unit 60212.

Optionally, the packet processing unit 60211 is further configured to: obtain, from the received first packet, an ID of the VF for forwarding the first packet; query, according to the ID of the VF, for a VF attribute corresponding to the ID of the VF; and when the VF attribute is a VxLAN attribute, obtain the VNI of the VF.

The packet processing unit 60211 may query, according to the obtained VNI of the VF and inner destination MAC of the first packet, whether the network adapter 602 stores the encapsulation information required for performing VxLAN encapsulation on the first packet.

Correspondingly, that the packet processing unit 60211 determines whether the network adapter 602 stores the encapsulation information required for performing VxLAN encapsulation on the first packet includes:

the packet processing unit 60211 queries, according to the VNI and the inner destination MAC address of the first packet, whether the network adapter 602 includes encapsulation information corresponding to the VNI of the VF and the inner destination MAC address of the first packet; and when the network adapter includes the encapsulation information corresponding to the VNI of the VF and the inner destination MAC address of the first packet, determines that the network adapter includes the encapsulation information required for performing VxLAN encapsulation on the first packet.

Further, the packet processing unit 60211 may query, in the entry management unit 60212, whether there is a related address information table, such as Table 1 in the foregoing embodiment, or Table 2 and Table 3 in the foregoing embodiment; and query, according to the related address information table, whether the entry management unit 60212 of the network adapter 602 includes the encapsulation information required for performing VxLAN encapsulation on the first packet.

Optionally, in this embodiment of the present disclosure, a quantity of times of using the address information table (which may be Table 1, or may be Table 2 and Table 3) may be recorded. Each time the packet processing unit 60211 searches the address information table in the entry management unit 60212 and finds encapsulation information required for performing VxLAN encapsulation on a packet that needs to be forwarded, the recorded quantity of times of using the recorded address information table is increased by 1. In this way, when entries of the address information table in the entry management unit 60212 fully occupy available storage space of the network adapter 602, an entry used for a lowest quantity of times may be deleted, such that an entry newly delivered by the central processing unit 601 may be added. When the storage space of the network adapter is limited, a latest entry may be stored, and efficiency of forwarding a packet by the network adapter is improved.

In this embodiment of the present disclosure, that the entry management unit 60212 stores the encapsulation information required for performing VxLAN encapsulation on the first packet includes:

the entry management unit 60212 stores a correspondence between a tunnel identifier, and the VNI of the VF for forwarding the first packet and the inner destination MAC address of the first packet, and stores a correspondence between the tunnel identifier and the encapsulation information.

A manner in which the network adapter 602 stores the encapsulation information required for performing VxLAN encapsulation on the first packet may be a manner of Table 1, or may be a manner of Table 2 and Table 3. For example, a MAC forwarding table is used to store the correspondence between the tunnel identifier, and the VNI of the VF for forwarding the first packet and the inner destination MAC address of the first packet; and a VTEP information table is used to store the correspondence between the tunnel identifier and the encapsulation information. In the manner of Table 2 and Table 3 (or the MAC forwarding table and the VTEP information table), the storage space of the network adapter can be saved, and it is avoided that excessive entries occupy the storage space of the network adapter.

Optionally, the network adapter processor 6021 further includes a virtual switch 60213. That the network adapter processor 6021 sends a packet obtained after the VxLAN encapsulation is performed on the first packet includes:

the packet processing unit 60211 in the network adapter processor 6021 performs VxLAN encapsulation on the first packet according to the encapsulation MAC address and the encapsulation IP address that are obtained by the entry management unit 60212, and sends the first packet using the virtual switch 60213; or the virtual switch 60213 in the network adapter processor 60211 receives and sends the packet that is sent by the central processing unit 601 and that is obtained after the VxLAN encapsulation is performed on the first packet.

When the virtual switch 60213 in the network adapter 602 receives and sends the packet that is sent by the central processing unit 601 and that is obtained after the VxLAN encapsulation is performed on the first packet, and after the packet processing unit 60211 sends the first packet and the VNI to the central processing unit 601, the network adapter 602 does not need to store the first packet, such that storage space that is of the network adapter and that is occupied for storing the first packet can be saved, and utilization of storage space of the network adapter can be improved.

Optionally, the packet processing unit 60211 is further configured to: receive a second packet sent to the virtual machine 603, where the second packet is a VxLAN packet; determine whether the entry management unit 60212 stores an encapsulation MAC address and an encapsulation IP address in the second packet; and when the entry management unit 60212 does not store the encapsulation MAC address and the encapsulation IP address in the second packet, send the second packet to the packet receiving unit 6011.

The obtaining and sending unit 6012 is further configured to: receive the second packet from the packet receiving unit 6011, and obtain the encapsulation MAC address and the encapsulation IP address in the second packet.

After the network adapter processor 6021 sends the second packet to the central processing unit, the central processing unit 601 may obtain and store the encapsulation MAC address and the encapsulation IP in the second packet according to the received second packet, for example, store the encapsulation IP address in an FDB entry, and record the encapsulation MAC address in an ARP entry. The central processing unit 601 stores the encapsulation MAC address and the encapsulation IP address in the second packet; and when subsequently receiving an obtaining request of the network adapter 602 that requests encapsulation information of a packet that has the same VNI and the same inner destination MAC address as the second packet, sends the encapsulation information to the network adapter 602 according to the stored encapsulation MAC address and encapsulation IP address in the second packet. Optionally, the related encapsulation IP address and encapsulation MAC address in the central processing unit 601 may also be stored in the central processing unit 601 by means of pre-configuration by an administrator.

For a further implementation of the computer device 600, reference may be made to the solution described in the embodiment related to FIG. 2, FIG. 3, or FIG. 4, and details are not described again.

The embodiments of the present disclosure further provide a computer readable medium, where the computer readable medium stores a computer readable instruction, and when the computer readable instruction is executed by a processor in a computer device, the processor is configured to:

receive a first packet sent by a virtual machine to a network adapter;

determine whether the network adapter stores encapsulation information required for performing virtual extensible local area network VxLAN encapsulation on the first packet, where the encapsulation information includes an encapsulation Media Access Control MAC address and an encapsulation Internet Protocol IP address, the encapsulation MAC address is a MAC address of a next-hop device passed through when the first packet is sent, and the encapsulation IP address is an IP address of a VTEP on a destination end of the first packet; and when the network adapter stores the encapsulation information required for performing VxLAN encapsulation on the first packet, perform VxLAN encapsulation on the first packet according to the encapsulation MAC address and the encapsulation IP address, and send the first packet; or when the network adapter does not store the encapsulation information required for performing VxLAN encapsulation on the first packet, send an obtaining request to a central processing unit in the computer device, obtain the encapsulation information from the central processing unit and store the encapsulation information, and send a packet obtained after the VxLAN encapsulation is performed on the first packet.

The network adapter includes at least one PF and at least one VF, and the virtual machine in the computer device directly sends a packet to the network adapter using the VF and sends the packet over a network. Optionally, each virtual machine in the computer device is uniquely corresponding to one VF, and the virtual machine forwards a packet to the network adapter using the unique corresponding VF.

In the embodiment of the computer readable medium, after receiving a first packet, a processor determines whether a network adapter stores encapsulation information required for performing VxLAN encapsulation on the first packet; if the network adapter stores the encapsulation information, performs VxLAN encapsulation on the first packet and sends the first packet; if the network adapter does not store the encapsulation information, requests the encapsulation information from a central processing unit and stores the encapsulation information; and sends a packet obtained after the VxLAN encapsulation is performed on the first packet, such that the network adapter implements the VxLAN encapsulation and the sending of the received packet.

Optionally, before the processor determines whether the network adapter stores the encapsulation information required for performing VxLAN encapsulation on the first packet, the processor is further configured to:

obtain, from the received first packet, an ID of a VF for forwarding the first packet, and query, according to the ID of the VF, for a VF attribute corresponding to the ID of the VF; and when the VF attribute is a VxLAN attribute, obtain a VxLAN network identifier VNI of the VF.

After the VNI of the VF is obtained, the processor may search an address forwarding table in the network adapter according to the VNI of the VF and an inner destination MAC address of the first packet, and determine whether the address forwarding table includes encapsulation information corresponding to the VNI of the VF and the inner destination MAC address of the first packet.

The determining whether the network adapter includes the encapsulation information required for performing VxLAN encapsulation on the first packet includes:

obtaining the VxLAN network identifier VNI of the VF for forwarding the first packet;

querying, according to the VNI and the inner destination MAC address of the first packet, whether the network adapter includes encapsulation information corresponding to the VNI of the VF and the inner destination MAC address of the first packet; and when the network adapter includes the encapsulation information corresponding to the VNI of the VF and the inner destination MAC address of the first packet, determining that the network adapter includes the encapsulation information required for performing VxLAN encapsulation on the first packet.

In this embodiment of the present disclosure, the processor may further record, according to the computer readable instruction in the computer readable medium, a quantity of times of finding the encapsulation information. Each time the encapsulation information is successfully found, the recorded quantity of times is increased by 1. In this way, when storage space of the network adapter is limited, a record of encapsulation information used for a lowest quantity of times may be deleted, such that a record of encapsulation information newly delivered by the central processing unit may be added. When the storage space of the network adapter is limited, a latest entry may be stored, and efficiency of forwarding a packet by the network adapter is improved.

In the computer readable medium in this embodiment of the present disclosure, a manner of storing the encapsulation information required for performing VxLAN encapsulation on the first packet includes:

storing a correspondence between a tunnel identifier, and the VNI of the VF for forwarding the first packet and the inner destination MAC address of the first packet, and storing a correspondence between the tunnel identifier and the encapsulation information. Optionally, a correspondence between the encapsulation information, and the VNI of the VF for forwarding the first packet and the inner destination MAC address of the first packet may be directly stored.

In the embodiment of the computer readable medium, the sending a packet obtained after the VxLAN encapsulation is performed on the first packet includes:

receiving and sending the packet that is sent by the central processing unit and that is obtained after the VxLAN encapsulation is performed on the first packet; or performing VxLAN encapsulation on the first packet according to the obtained encapsulation information required for performing VxLAN encapsulation on the first packet, and sending the first packet.

When the processor receives and sends the packet that is sent by the central processing unit and that is obtained after the VxLAN encapsulation is performed on the first packet, and after the processor sends the first packet and the VNI to the central processing unit, the processor does not need to store the first packet, such that storage space that is of the network adapter and that is occupied for storing the first packet can be saved, and utilization of storage space of the network adapter can be improved.

In the embodiment of the computer readable medium, the processor is further configured to perform the following steps:

receive a second packet sent to the virtual machine, where the second packet is a VxLAN packet;

determine whether the network adapter stores an encapsulation MAC address and an encapsulation IP address in the second packet; and when the network adapter does not store the encapsulation MAC address and the encapsulation IP address in the second packet, send the second packet to the central processing unit.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for sending a virtual extensible local area network (VxLAN) packet, wherein the method is applied to a computer device, the computer device comprises a central processing unit, and a network adapter, and a virtual machine runs on the computer device, the network adapter comprises a network adapter processor, and the method comprises:

receiving, by the network adapter processor, a first packet sent by the virtual machine;

determining, by the network adapter processor, whether the network adapter stores encapsulation information required for performing VxLAN encapsulation on the first packet, wherein the encapsulation information comprises an encapsulation Media Access Control (MAC) address and an encapsulation Internet Protocol (IP) address, the encapsulation MAC address is a MAC address of a next-hop device passed through when the first packet is sent, and the encapsulation IP address is an IP address of a virtual extensible local area network tunnel end point (VTEP) on a destination end of the first packet;

in response to the network adapter storing the encapsulation information required for performing VxLAN encapsulation on the first packet, performing, by the network adapter processor, VxLAN encapsulation on the first packet according to the encapsulation information; and sending, by the network adapter processor, the encapsulated first packet.

2. The method according to claim 1, wherein before the determining whether the network adapter stores encapsulation information required for performing the VxLAN encapsulation on the first packet, the method further comprises:

obtaining, by the network adapter processor from the received first packet, an identification (ID) of a virtual function (VF) for forwarding the first packet;

querying, by the network adapter processor according to the ID of the VF, for a VF attribute corresponding to the ID of the VF; and obtaining a VxLAN network identifier (VNI) of the VF when the VF attribute is a VxLAN attribute.

3. The method according to claim 2, wherein the determining, by the network adapter processor, whether the network adapter stores encapsulation information required for performing VxLAN encapsulation on the first packet comprises:

querying, by the network adapter processor according to the VNI and an inner destination MAC address of the first packet, whether the network adapter comprises encapsulation information corresponding to the VNI of the VF and the inner destination MAC address of the first packet; and determining that the network adapter stores the encapsulation information required for performing VxLAN encapsulation on the first packet when the network adapter comprises the encapsulation information corresponding to the VNI of the VF and the inner destination MAC address of the first packet.

4. The method according to claim 3, wherein:
a manner of storing, by the network adapter, the encapsulation information required for performing VxLAN encapsulation on the first packet comprises:
storing, by the network adapter, a correspondence between a tunnel identifier, and the VNI of the VF for forwarding the first packet and the inner destination MAC address of the first packet, and storing a correspondence between the tunnel identifier and the encapsulation information.

5. The method according to claim 1, wherein the sending, by the network adapter processor, a packet obtained after the VxLAN encapsulation is performed on the first packet comprises:
performing, by the network adapter processor, VxLAN encapsulation on the first packet according to the obtained encapsulation information required for performing VxLAN encapsulation on the first packet, and sending the first packet using a virtual switch in the network adapter.

6. The method according to claim 1, wherein the sending, by the network adapter processor, the packet obtained after the VxLAN encapsulation is performed on the first packet comprises:
receiving and sending, by a virtual switch in the network adapter, the packet that is sent by the central processing unit and that is obtained after the VxLAN encapsulation is performed on the first packet.

7. The method according to claim 1, further comprising:
receiving, by the network adapter, a second packet sent to the virtual machine, wherein the second packet is a VxLAN packet;
determining, by the network adapter processor, whether the network adapter stores an encapsulation MAC address and an encapsulation IP address in the second packet; and
sending the second packet to the central processing unit when the network adapter does not store the encapsulation MAC address and the encapsulation IP address in the second packet.

8. An apparatus, comprising a central processing unit, a network adapter, and a virtual machine running on the apparatus, wherein the network adapter comprises a network adapter processor configured to:
receive a first packet sent by the virtual machine;
determine whether the network adapter stores encapsulation information required for performing virtual extensible local area network (VxLAN) encapsulation on the first packet, wherein the encapsulation information comprises an encapsulation Media Access Control (MAC) address and an encapsulation Internet Protocol (IP) address, the encapsulation MAC address is a MAC address of a next-hop device passed through when the first packet is sent, and the encapsulation IP address is an IP address of a virtual extensible local area network tunnel end point (VTEP) on a destination end of the first packet; and
in response to the network adapter storing the encapsulation information required for performing VxLAN encapsulation on the first packet, perform VxLAN encapsulation on the first packet according to the encapsulation information; and
send the encapsulated first packet.

9. The apparatus according to claim 8, further comprising a transceiver,
wherein the central processing unit is configured to receive the obtaining request sent by a packet processor of the network adapter processor, wherein the obtaining request comprises the first packet and a VxLAN network identifier (VNI) of a virtual function (VF) for forwarding the first packet; and
wherein the transceiver is configured to:
obtain, according to the obtaining request received by a packet receiver of the central processing unit, the encapsulation information required for performing VxLAN encapsulation on the first packet, and
send the encapsulation information to an entry manager of the network adapter processor.

10. The apparatus according to claim 8, wherein:
the network adapter processor is further configured to: obtain, from the received first packet, an ID of a virtual function (VF) for forwarding the first packet; query, according to the ID of the VF, for a VF attribute corresponding to the ID of the VF; and obtain the VxLAN network identifier (VNI) of the VF when the VF attribute is a VxLAN attribute.

11. The apparatus according to claim 10, wherein the network adapter processor is configured to:
query, according to the VNI and an inner destination MAC address of the first packet, whether the network adapter comprises encapsulation information corresponding to the VNI of the VF and the inner destination MAC address of the first packet; and
determine that the network adapter comprises the encapsulation information required for performing VxLAN encapsulation on the first packet when the network adapter comprises the encapsulation information corresponding to the VNI of the VF and the inner destination MAC address of the first packet.

12. The apparatus according to claim 8, wherein the network adapter processor is further configured to store a correspondence between a tunnel identifier, and the VNI of the VF for forwarding the first packet and the inner destination MAC address of the first packet, and store a correspondence between the tunnel identifier and the encapsulation information.

13. The apparatus according to claim 8, wherein the network adapter processor further comprises a virtual switch and the network adapter processor is further configured to perform VxLAN encapsulation on the first packet according to the encapsulation information.

14. The apparatus according to claim 8, wherein the network adapter processor further comprises a virtual switch, the virtual switch is configured to receive and send the packet that is sent by the central processing unit and that is obtained after the VxLAN encapsulation is performed on the first packet.

15. The apparatus according to claim 8, wherein:
the network adapter processor is further configured to:
receive a second packet sent to the virtual machine, wherein the second packet is a VxLAN packet;
determine whether the network adapter processor stores an encapsulation MAC address and an encapsulation IP address in the second packet; and
in response to an entry manager not storing an encapsulation MAC address and an encapsulation IP address of the second packet, send the second packet to the central processing unit; and the transceiver is further configured to: receive the second packet from the central processing unit, and obtain the encapsulation MAC address and the encapsulation IP address in the second packet.

16. A network adapter, wherein the network adapter supports single-root input/output virtualization (SR-IOV) and supports a forwarding function of a virtual switch (vSwitch), and the network adapter comprises a network adapter processor configured to:

receive a first packet sent by a virtual machine;

implement a data encapsulation function of a virtual extensible local area network tunnel end point (VTEP) to perform virtual extensible local area network (VxLAN) encapsulation on the first packet according to encapsulation information, wherein the encapsulation information comprises an encapsulation Media Access Control (MAC) address and an encapsulation Internet Protocol (IP) address, the encapsulation MAC address is a MAC address of a next-hop device passed through when the first packet is sent, and the encapsulation IP address is an IP address of a virtual extensible local area network tunnel end point (VTEP) on a destination end of the first packet; and send the encapsulated first packet to the network.

17. The network adapter according to claim 16, wherein the network adapter processor is further configured to:

receive a second packet sent to the virtual machine, wherein the second packet is a VxLAN packet;

implement a data decapsulation function of the VTEP to perform VxLAN decapsulation on the second packet; and send the second packet obtained after the VxLAN decapsulation to the virtual machine.

* * * * *

UNITED STATES PATENT AND TRADEMARK OFFICE
CERTIFICATE OF CORRECTION

PATENT NO. : 11,283,650 B2
APPLICATION NO. : 16/703392
DATED : March 22, 2022
INVENTOR(S) : Zhenliang Ma It is certified that error appears in the above-identified patent and that said Letters Patent is hereby corrected as shown below:

In the Claims

Claim 8, Column 35, Line 64: "first packet; and" should read -- first packet; --.

Signed and Sealed this
Twelfth Day of July, 2022

Katherine Kelly Vidal
*Director of the United States Patent and Trademark Office*